US012439096B2

(12) United States Patent
Gadgil et al.

(10) Patent No.: US 12,439,096 B2
(45) Date of Patent: Oct. 7, 2025

(54) CONTEXT-BASED RESHAPING ALGORITHMS FOR ENCODING VIDEO DATA

(71) Applicant: Dolby Laboratories Licensing Corporation, San Francisco, CA (US)

(72) Inventors: Neeraj J. Gadgil, Pune (IN); Guan-Ming Su, Freemont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/702,730

(22) PCT Filed: Oct. 20, 2022

(86) PCT No.: PCT/US2022/047226
§ 371 (c)(1),
(2) Date: Apr. 18, 2024

(87) PCT Pub. No.: WO2023/069585
PCT Pub. Date: Apr. 27, 2023

(65) Prior Publication Data
US 2025/0234051 A1    Jul. 17, 2025

Related U.S. Application Data

(60) Provisional application No. 63/270,097, filed on Oct. 21, 2021.

(30) Foreign Application Priority Data

Oct. 21, 2021  (EP) ..................... 21203845

(51) Int. Cl.
*H04N 19/98* (2014.01)
*G06F 17/18* (2006.01)
*H04N 19/172* (2014.01)

(52) U.S. Cl.
CPC ............ *H04N 19/98* (2014.11); *G06F 17/18* (2013.01); *H04N 19/172* (2014.11)

(58) Field of Classification Search
CPC ....... H04N 19/98; H04N 19/172; G06F 17/18
See application file for complete search history.

(56) References Cited

U.S. PATENT DOCUMENTS 9,497,456 B2   11/2016   Su
10,032,262 B2   7/2018   Kheradmand
(Continued)

FOREIGN PATENT DOCUMENTS

EP          3203442 A1    8/2017
WO       2019169174 A1    9/2019
(Continued)

OTHER PUBLICATIONS

Gadgil, et al; "Efficient Banding-Alleviating Inverse Tone Mapping for High Dynamic Range Video"; 53rd Asilomar Conference on Signals, Systems and Computers, IEEE; Nov. 3, 2019, pp. 1885-1889.

*Primary Examiner* — Kyle M Lotfi

(57) ABSTRACT

Systems and methods for context-based encoding of video data using reshaping algorithms. One method includes receiving the video data, the video data composed of a plurality of image frames, each image frame including a plurality of pixel blocks. The method includes determining, for each pixel block, a luma bin index, determining, for each luma bin, a banding risk value, and determining Gaussian function parameters based on the banding risk value. The method includes generating a differential reshaping function using the Gaussian function parameters, computing a luma-based forward reshaping function based on the differential reshaping function, and generating an output image for each
(Continued)

image frame by applying the luma-based forward reshaping function to the respective image frame.

13 Claims, 15 Drawing Sheets

(56) References Cited

U.S. PATENT DOCUMENTS

| | | | |
|---|---|---|---|
| 10,223,774 | B2 | 3/2019 | Kadu et al. |
| 10,419,762 | B2 | 9/2019 | Froehlich |
| 11,310,537 | B2 | 4/2022 | Gadgil |
| 2015/0078661 | A1* | 3/2015 | Granados ................ G06T 5/92 |
| | | | 382/167 |
| 2018/0309995 | A1* | 10/2018 | He ...................... H04N 19/186 |
| 2023/0308667 | A1 | 9/2023 | Gadgil |
| 2024/0007682 | A1 | 1/2024 | Horvath |
| 2024/0283975 | A1 | 8/2024 | Gadgil |

FOREIGN PATENT DOCUMENTS

| | | |
|---|---|---|
| WO | 2020033573 A1 | 2/2020 |
| WO | 2020072651 A1 | 4/2020 |

* cited by examiner

CONTEXT-BASED RESHAPING ALGORITHMS FOR ENCODING VIDEO DATA

1. CROSS-REFERENCE TO RELATED APPLICATIONS

This application is a U.S. National Stage application under U.S.C. 371 of International Application No. PCT/US2022/047226, filed on 20 Oct. 2022 (reference: D21086WO01), which claims the benefit of priority from U.S. Provisional Patent Application No. 63/270,097, filed on Oct. 21, 2021, and European Patent Application No. 21203845.9, filed Oct. 21, 2021, both of which are incorporated herein by reference in their entirety.

2. FIELD OF THE DISCLOSURE

This application relates generally to systems and methods of encoding high dynamic range (HDR) video content using reshaping algorithms.

3. BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using linear luminance coding, images where n<8 are considered images of standard dynamic range, while images where n>8 (e.g., color 24-bit JPEG images) may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

Gadgil, Neeraj J. et al.: "Efficient Banding-Alleviating Inverse Tone Mapping for High Dynamic Range Video", 53$^{rd}$ Asilomar Conference on Signals, Systems, and Computers, IEEE, 3 Nov. 2019, pages 1885-1889, XP033750575, discloses an approach to constructing an HDR image from a standard dynamic range (SDR) image is to use inverse tone mapping (iTM). However, it can create or amplify visual artifacts such as banding/false contouring in the resulting HDR images. To address this, a novel method is proposed to efficiently construct iTM to reduce banding in the highlight regions of HDR images. The proposed approach uses a given iTM curve to estimate the banding-risk in each luminance range, based on the input SDR image properties. Then, the risk measure is used to adjust the local slope of the iTM to avoid banding in the resulting HDR images. Experimental results exhibit that the proposed method is highly effective in reducing banding in the HDR images.

WO 2020/033573 A1 discloses methods and systems for reducing banding artifacts when displaying high-dynamic-range images. Given an input image in a first dynamic range, and an input backward reshaping function mapping codewords from the first dynamic range to a second dynamic range, wherein the second dynamic range is equal or higher than the first dynamic range, statistical data based on the input image and the input backward reshaping function are generated to estimate the risk of banding artifacts in a target image in the second dynamic range generated by applying the input backward reshaping function to the input image. Separate banding alleviation algorithms are applied in the darks and highlights parts of the first dynamic range to generate a modified backward reshaping function, which when applied to the input image to generate the target image eliminates or reduces banding in the target image.

WO 2020/072651 A1 discloses methods and systems for reducing banding artifacts when displaying high-dynamic-range images reconstructed from coded reshaped images. Given an input image in a high dynamic range (HDR) which is mapped to a second image in a second dynamic range, banding artifacts in a reconstructed HDR image generated using the second image are reduced by a) in darks and mid-tone regions of the input image, adding noise to the input image before being mapped to the second image, and b) in highlights regions of the input image, modifying an input backward reshaping function, wherein the modified backward reshaping function will be used by a decoder to map a decoded version of the second image to the reconstructed HDR image. An example noise generation technique using simulated film-grain noise is provided.

EP 3 203 442 A1 discloses a processor for signal reshaping that receives an input image with an input bit depth. Block-based standard deviations are computed. The input codewords are divided into codeword bins and each bin is assigned a standard deviation value. For each bin, a standard deviation to bit-depth function is applied to the bin values to generate minimal bit depth values for each codeword bin. An output codeword mapping function is generated based on the input bit depth, a target bit depth, and the minimal bit depth values. The codeword mapping function is applied to the input image to generate an output image in the target bit depth.

BRIEF SUMMARY OF THE DISCLOSURE

The invention is defined by the independent claims. The dependent claims concern optional features of some embodiments of the invention. In growing uses for HDR content, such as cloud-based gaming, there is a need to transmit HDR video data to target display devices (e.g., a TV) using encoding, such as 8-bit base layer (BL) that has minimum latency. For cloud gaming cases specifically, 8-bit advanced video coding (AVC) BL may be needed. Accordingly, encoders for such cases need to transfer HDR content to a lower bit-depth-domain and provide metadata for the receiving decoder such that the decoder reconstructs the HDR content from the decompressed BL.

Additionally, for cloud-based gaming and other real-time uses of HDR content, there is a need for low latency and lightweight computations. Accordingly, feature-based efficient reshaping algorithms for converting HDR content to BL and generating backwards reshaping metadata for reconstructing the HDR content may be used. Bitstreams may be generated that allows for an eight-piece polynomial function for luma reshaping and two-piece polynomials for chroma reshaping. This avoids heavy computation, reducing latency.

Additionally, 8-bit BL may experience banding artifacts in the reconstructed HDR content. Banding generally exhibits in the smoother regions of an image. The visibility of banding is dependent on how large (e.g., how many pixels) the affected region is relative to the image as a whole. By having a content-adaptive non-linear reshaping function, banding is minimized.

Proposed systems and methods collect and use block-based image statistics, such as the standard deviation and histogram image statistics in the luma channel. These statistics are used to construct an image-feature as a function of discrete luma codeword-ranges (known as "bins"). The value of this binwise-feature indicates which bin has the greatest need for codewords. The identified bin is assigned as the "peak" bin for a functional curve (e.g., a Gaussian curve, a parabolic curve, or the like) that encompasses the entire luma codeword range. The shape of the curve is determined by the relative values of the feature. This functional curve is used to compute a forward reshaping function for the image. The forward reshaping function is used to compress the HDR video data, as described in more detail below. Additionally, to improve banding reduction performance, synthetically-generated film-grain noise of a fixed maximum strength can be injected to the HDR luma channel prior to reshaping. Accordingly, the proposed encoding framework is computationally efficient to meet the low delay requirement and is effective in reducing banding in the reconstructed HDR content.

Various aspects of the present disclosure relate to devices, systems, and methods for encoding video data using reshaping algorithms. While certain embodiments are directed to HDR video data, video data may also include Standard Dynamic Range (SDR) video data and other User Generated Content (UGC), such as gaming content.

In one exemplary aspect of the present disclosure, there is provided a video delivery system for context-based encoding of video data. The delivery system comprises a processor to perform encoding of video data. The processor is configured to receive the video data, the video data composed of a plurality of image frames, each image frame including a plurality of pixel blocks. The processor is configured to determine, for each pixel block, a luma bin index, determine, for each luma bin, a banding risk value, and determine Gaussian function parameters based on the banding risk value. The processor is configured to generate a differential reshaping function using the Gaussian function parameters, compute a luma-based forward reshaping function based on the differential reshaping function, and generate an output image for each image frame by applying the luma-based forward reshaping function to the respective image frame.

In another exemplary aspect of the present disclosure, there is provided a method for context-based encoding of video data. The method includes receiving the video data, the video data composed of a plurality of image frames, each image frame including a plurality of pixel blocks. The method includes determining, for each pixel block, a luma bin index, determining, for each luma bin, a banding risk value, and determining Gaussian function parameters based on the banding risk value. The method includes generating a differential reshaping function using the Gaussian function parameters, computing a luma-based forward reshaping function based on the differential reshaping function, and generating an output image for each image frame by applying the luma-based forward reshaping function to the respective image frame.

In another exemplary aspect of the present disclosure, there is provided a non-transitory computer-readable medium storing instructions that, when executed by a processor of a video delivery system, cause the video delivery system to perform operations comprising receiving the video data, the video data composed of a plurality of image frames, each image frame including a plurality of pixel blocks, determining, for each pixel block, a luma bin index, determining, for each luma bin, a banding risk value, determining Gaussian function parameters based on the banding risk value, generating a differential reshaping function using the Gaussian function parameters, computing a luma-based forward reshaping function based on the differential reshaping function, and generating an output image for each image frame by applying the luma-based forward reshaping function to the respective image frame.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that these are merely examples. It will further be understood that the disclosed systems and methods can be used in any device in which there is a need to project light; for example, cinema, consumer, and other commercial projection systems, heads-up displays, virtual reality displays, and the like. Disclosed systems and methods may be implemented in additional display devices, such as with an OLED display, an LCD display, a quantum dot display, or the like.

Video Coding of HDR Signals

Figure 1:
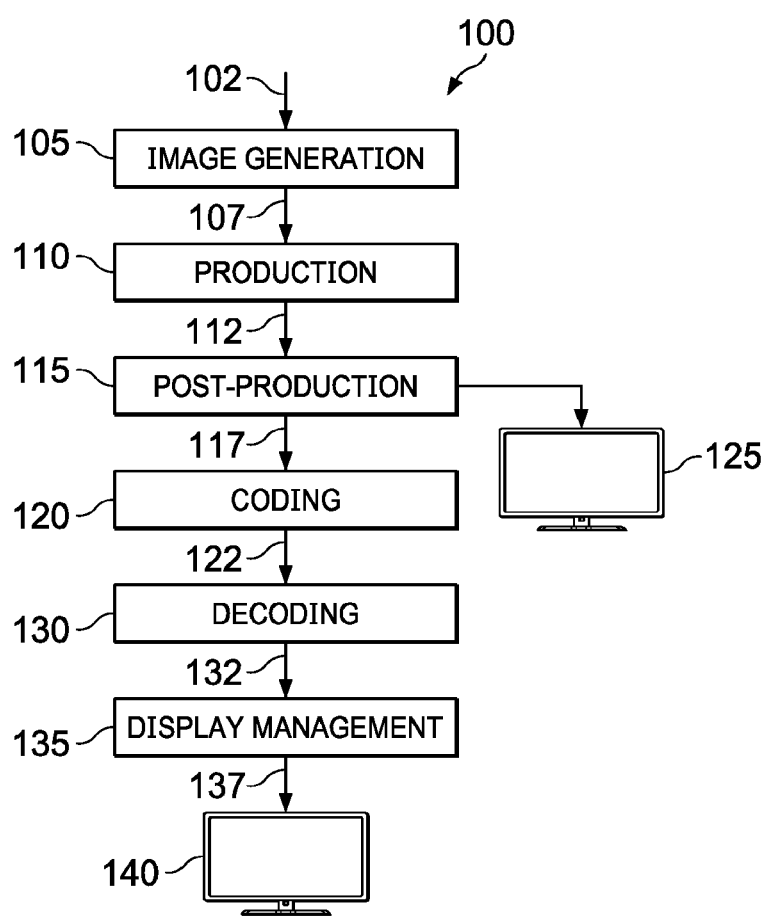
FIG. 1 depicts an example process for a video delivery pipeline.

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor (or one or more processors such as a central processing unit (CPU)) at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). Methods described herein may be performed by the processor at block (120). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Additional methods described herein may be performed by the decoding unit (130) or the display management block (135). Both the decoding unit (130) and the display management block (135) may include their own processor, or may be integrated into a single processing unit.

Figure 2:
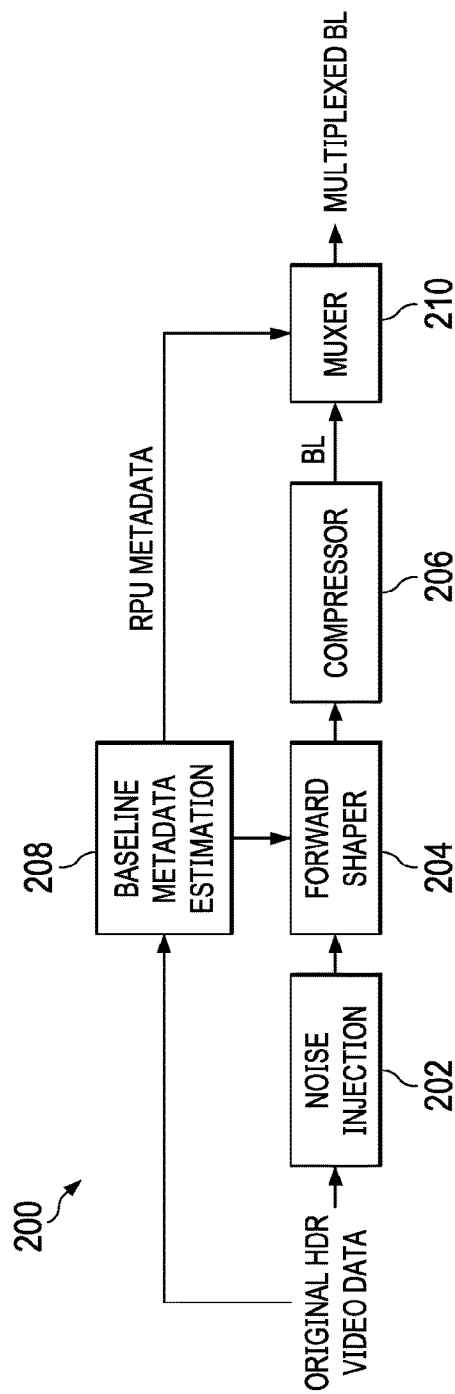
FIG. 2 depicts an example block diagram of an encoder.

FIG. 2 illustrates a block diagram of an encoder (200) for performing the forward-reshaping operation. The encoder (200) includes a noise injection block (202), a forward reshaping block (204), a compressor block (206), a metadata estimation block (208), and a multiplexer (or muxer) block (210). Original HDR video content is provided to both the noise injection block (202) and the metadata estimation block (208). The metadata estimation block (208) analyzes features of the HDR video content to generate non-linear luma and linear chroma reshaping functions used by the forward reshaping block (204). The noise injection block (202) may add film-grain noise to the HDR video content for additional banding alleviation. The forward reshaping block (204) performing the reshaping operation of the HDR video content before it is compressed by compressor block (206) into the 8-bit base layer (BL). The base layer is multiplexed with metadata from the metadata estimation block (208) by the muxer block (210). The multiplexed base layer is then provided to a downstream decoder.

Figure 3:
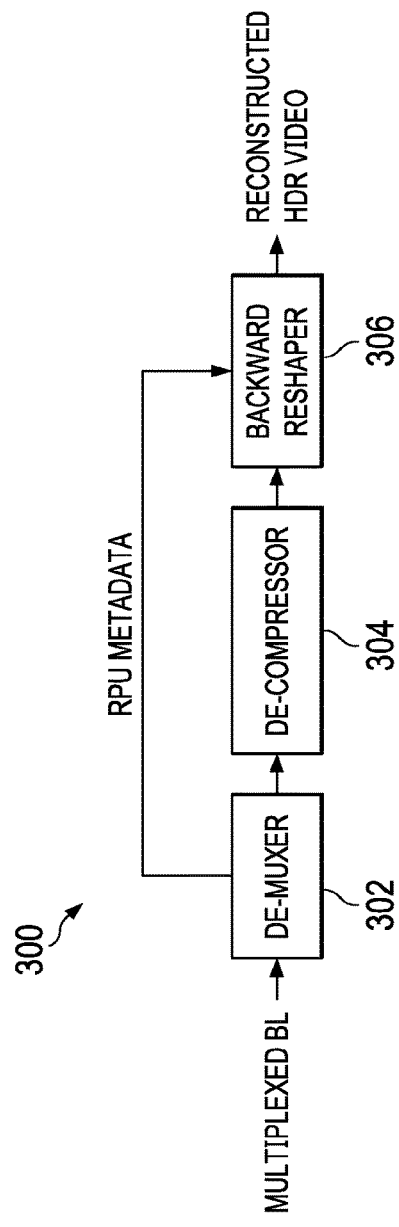
FIG. 3 depicts an example block diagram of a decoder.

FIG. 3 illustrates a block diagram of a decoder (300) for decoding a received multiplexed base layer. The decoder (300) includes a de-multiplexing (or de-muxer) block (302), a decompressor block (304), and a backward reshaping block (306). The de-muxer block (302) receives the multiplexed base layer from the encoder (200) and separates the HDR video content from the metadata. The decompressor block (304) decompresses the HDR video content. The backward reshaping block (306) uses the metadata to perform a backward-reshaping operation on the HDR video content to reconstruct the HDR video content.

Gaussian Functions

As mentioned above, a Gaussian function may be used for determining the reshaping function. A Gaussian function $\gamma(\cdot)$ for an input x is defined as:

$$y(x) = a.e^{-\left\{\frac{(x-\mu_G)^2}{2\sigma_G^2}\right\}}, \quad \text{[Equation 1]}$$

where $\mu_G$ is the mean and $\sigma_G$ is the standard deviation of the underlying Gaussian distribution.

Figure 4:
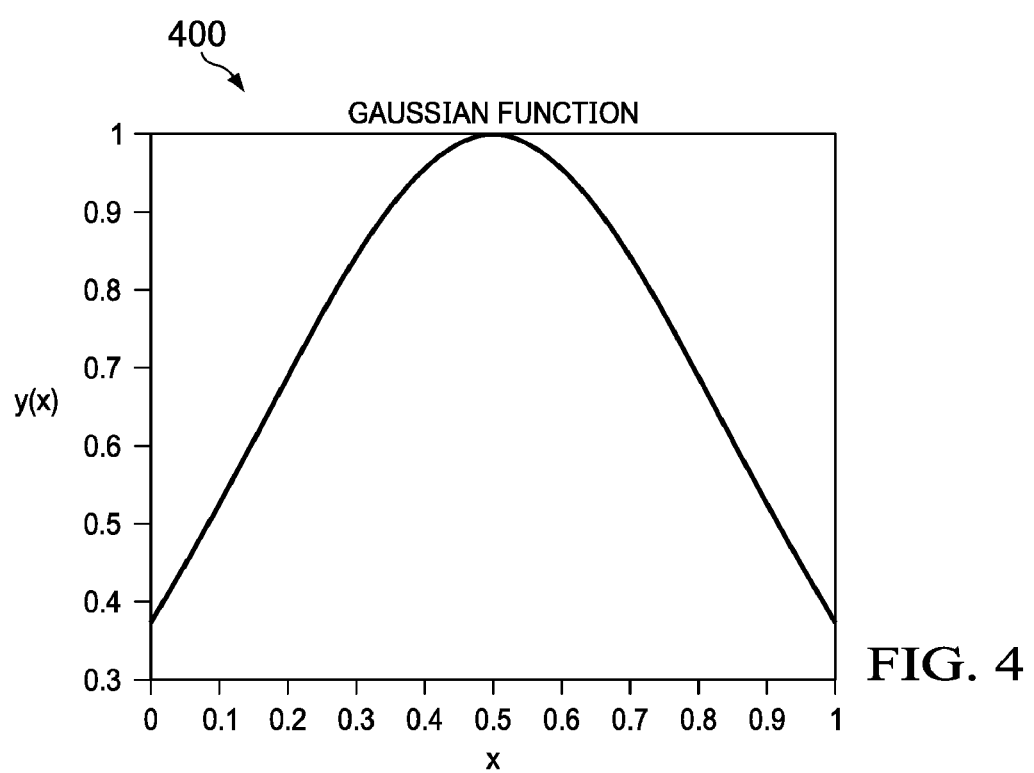
FIG. 4 depicts an example Gaussian function.

Without loss of generality, a=1 may be set such that the maximum of the Gaussian function is 1 for given inputs. FIG. 4 provides a Gaussian function (400) where a=1, $\mu_G$=0.5, and $$\frac{1}{2\sigma_G^2} = 5,$$

producing a bell-snapea curve. The maximum value of the curve is centered at the means of $\mu_G$=0.5 and tapers down symmetrically in both directions as x moves away from the mean. Varying the mean $\mu_G$ varies the "location" of the peak with respect to x. Additionally, varying $$\frac{1}{2\sigma_G^2},$$

henceforth referred to as $k_G$, varies the width of the Gaussian function. Specifically, a higher value of $k_G$ results in a steeper bell-shaped curve, whereas lower values of $k_G$ "flatten" the curve.

Additional Notation

Let $(v_i^Y, v_i^{cb}, v_i^{Cr})$ be the YCbCr values at pixel i of an original HDR image of bit-depth $\eta_v$ and spatial dimensions (W×H). Pixels are assumed to be stored in a data-structure in raster-scan order. There are total $N_v = 2^{\eta_v}$ HDR codewords e.g. for 16-bit signal, $N_v$=65536. Let $(\bar{v}_i^Y, \bar{v}_i^{Cb}, \bar{v}_i^{Cr})$ be normalized pixel values as floating point number between [0,1) such that $$\bar{v}_i^p = \frac{v_i^Y}{N_v},$$

for p-channel, p={Y, Cb, Cr}. Let $(v_L^Y, v_L^Y)$, $(v_L^{Cb}, v_H^{Cb})$, $(v_L^{Cr}, v_H^{Cr})$ be the minimum and maximum values in Y, Cb, Cr channels and $(\bar{v}_L^Y, \bar{v}_H^Y)$, $(\bar{v}_L^{Cb}, \bar{v}_H^{Cb})$, $(\bar{v}_L^{Cr}, \bar{v}_H^{Cr})$ be their normalized values respectively.

Let $s_i^p$ be the forward-reshaped (BL) signal in the p-axis. There are $N_s = 2^{\eta_s}$ number of BL codewords e.g. for 8-bit BL, $N_s$=256. Normalized BL codeword can be computed as $$\bar{s}_i^p = \frac{s_i^p}{N_s}.$$

Let $T_p^F(\cdot):[0, N_v-1] \rightarrow [0, N_s-1]$ be the single-channel forward reshaping (integer-valued) function for p-channel, where p can be one of Y, Cb, Cr channels. It can be stored in the form of look-up table (LUT), known as forward LUT (FLUT). Let $s_i^p$ be the resulting reshaped i'th pixel value of p-channel:

$$s_i^p = T_p^F(v_i^p) \quad \text{[Equation 2]}$$

The FLUT $T_p^F(\cdot)$ can also be constructed using a normalized FLUT $\bar{T}_p^F(\cdot):[0,1) \rightarrow [0,1)$, that converts a normalized HDR codeword to a normalized BL codeword, such that:

$$s_i^p = T_p^F(v_i^p) = clip3\left(\text{round}\left[N_s \cdot \bar{T}_p^F\left(\frac{v_i^p}{N_v}\right)\right], 0, N_s - 1\right) \quad \text{[Equation 3]}$$

where round [·] is rounding operation and clip3 (value, a, b) is clipping operation that limits value between [a,b]

Let $\bar{T}_p^B(\cdot):[0,1) \rightarrow [0,1)$ be the normalized backward LUT (BLUT) that convert a normalized BL codeword to a normalized HDR value [0,1]. Let $s_i^p$ be the p'th channel decompressed BL value at pixel i. We normalize it using $$\bar{s}_i^{(r)p} = \left(\frac{s_i^{(r)p}}{N_s}\right).$$

Using the BL and the BLUT, the reconstructed normalized HDR value in pth channel at pixel i is $\bar{v}_i^{(r)p} \in [0,1)$:

$$\bar{v}_i^{(r)p} = \bar{T}_p^B(\bar{s}_i^{(r)p}) \quad \text{[Equation 4]}$$

and the reconstructed $\eta_v$-bit HDR is: $v_i^{(r)p}$=clip3 (round[$N_v \cdot \bar{v}_i^{(r)p}$], 0, $N_v$-1).

The normalized BLUT $\bar{T}_p^B$ is specified using piecewise polynomial via the RPU metadata. Let $\Omega^p$ be the maximum number of polynomial pieces in p-channel. Let $\rho_l^p$ be pivot points expressed as $\eta_s$-bit BL codewords in p-channel, l=0,1, ..., $\Omega^p$, e.g. an 8-piece luma polynomial is specified using 8+1=9 pivot points. Let $\alpha_q^{p,m}$ be the q'th order coefficient of m'th polynomial piece in p-channel. For $2^{nd}$ order $\Omega^p$-piece luma polynomial, we have $\alpha_q^{Y,m}$ with q=0, 1,2 and m=0,1,2, ..., ($\Omega^p$-1) of the $\Omega^p$ pieces:

$$\bar{v}_i^{(r)p} = \{a_0^{p,m} + a_1^{p,m}(\bar{s}_i^{(r)p}) + a_2^{p,m}(\bar{s}_i^{(r)p})^2\}, \quad \text{[Equation 5]}$$

where m is such that $\beta_m^p \le s_i^{(r)p} < \rho_{m+1}^p$. Note that, as a standard practice, $T_p^F(\cdot)$ and $T_p^B(\cdot)$ may be monotonically non-decreasing functions.

Forward Reshaping Using Gaussian Differential LUT

A forward reshaping function is a monotonically non-decreasing function that transfers a higher bit-depth codeword (e.g., 16-bit [0, 65535]) to a lower bit-depth (e.g., 8-bit [0,255]). The forward reshaping function may be expressed as a forward look-up table (FLUT). The FLUT can be constructed using a differential look-up table (dLUT) that specifies the amount of increment to the previous value of FLUT to get the current value. For example:

$$\bar{T}_p^F\left(\frac{v}{N_v}\right) = \bar{T}_p^F\left(\frac{v-1}{N_v}\right) + \bar{\delta}_p\left(\frac{v}{N_v}\right), \quad \text{[Equation 6]}$$

where $\bar{\delta}_p(\cdot):[0,1) \rightarrow [0,1)$ is the dLUT.

Equation 6 also gives the expression for the FLUT using cumulative summation of all small increments up to the current codeword:

$$\bar{T}_p^F\left(\frac{v}{N_v}\right) = \sum_{ind=0}^{v} \bar{\delta}_p\left(\frac{ind}{N_v}\right). \quad \text{[Equation 7]}$$

Figure 5A:
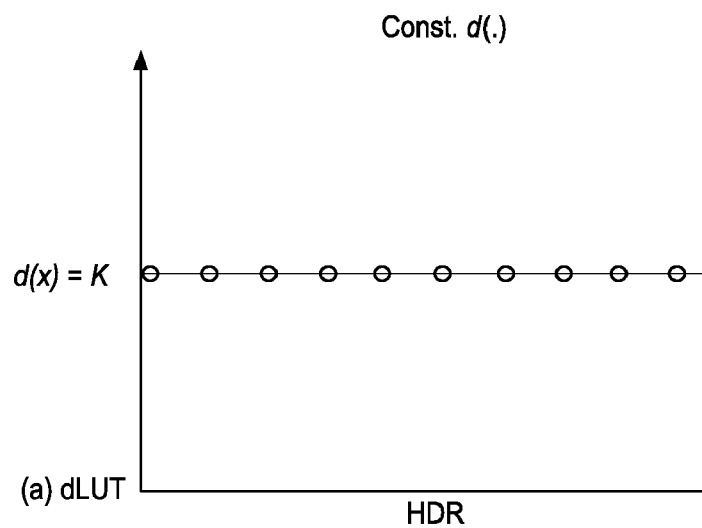
FIGS. 5A-5D depict example forward reshaping functions and corresponding differentials.
Figure 5B:
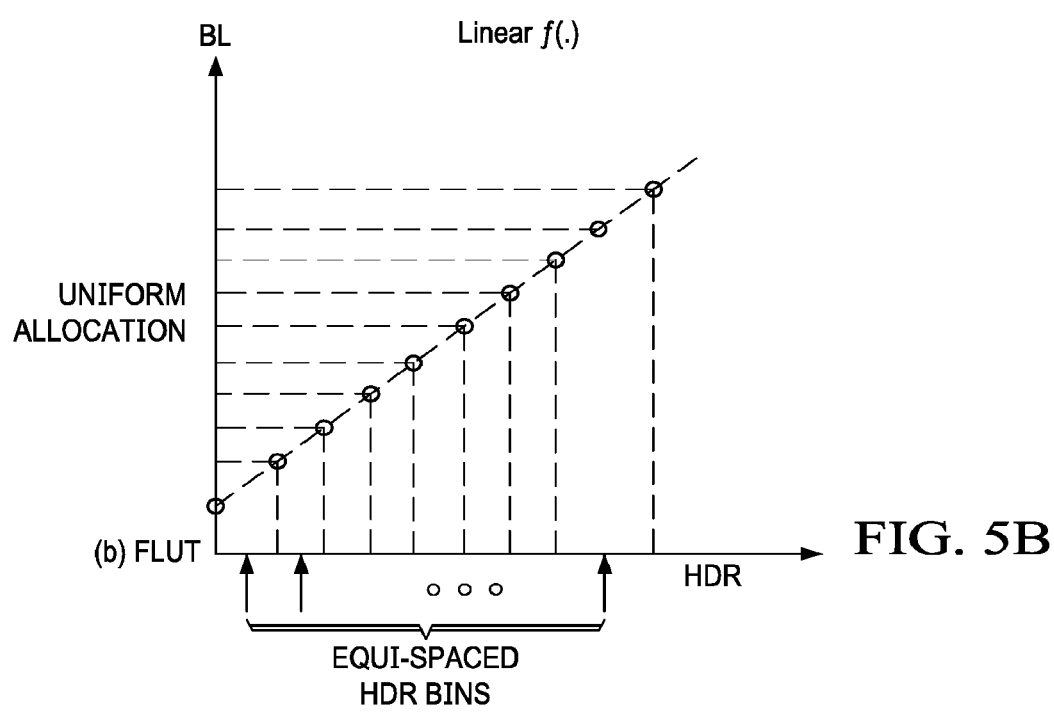
Figure 5C:
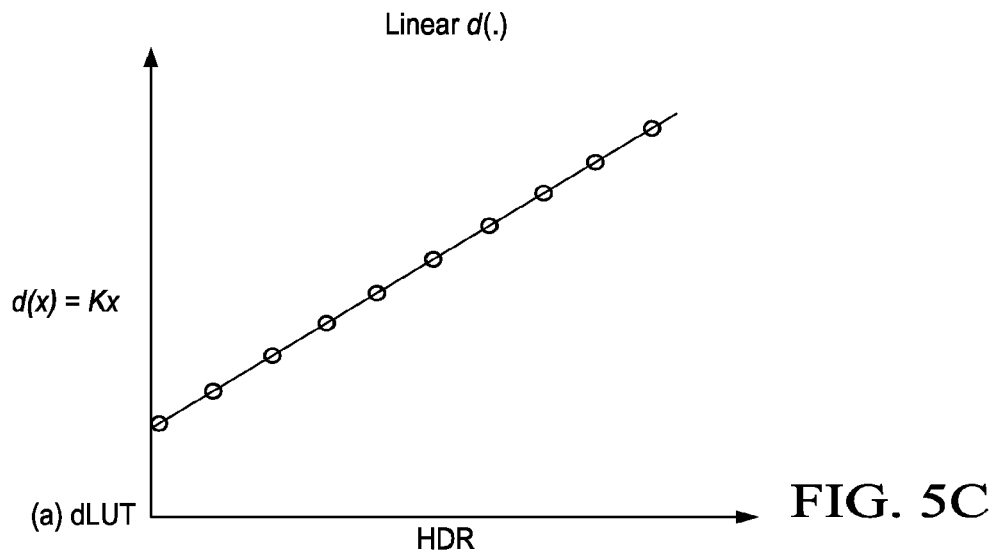
Figure 5D:
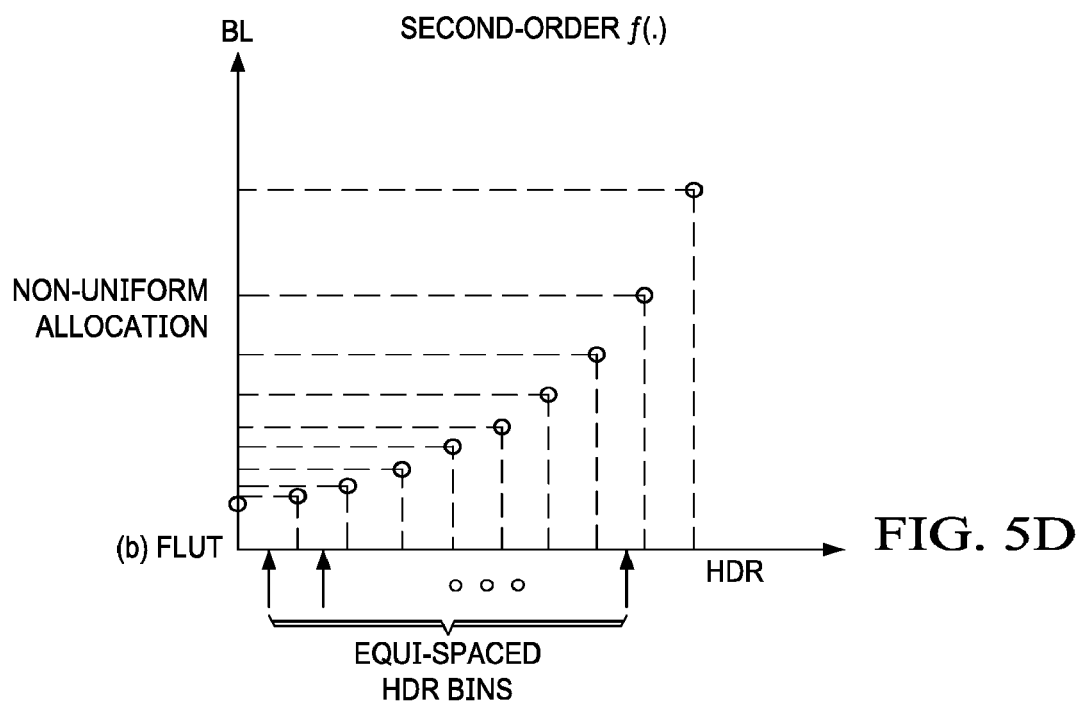

FIGS. 5A-5D illustrate example FLUT and dLUT functions. For example, FIG. 5A illustrates a constant-valued dLUT $\bar{\delta}_p(\cdot)$=K. A corresponding FLUT is constructed by cumulatively adding the dLUT values to obtain a straight line, as shown in FIG. 5B. In another example, the dLUT is a linear function, as shown in FIG. 5C. The corresponding FLUT is a second order polynomial, shown in FIG. 5D.

Accordingly, the dLUT defines the local slope of its corresponding FLUT. The dLUT specifies how many codewords are allocated to a given luminance range. A higher value of dLUT indicates more codewords in that range. Conversely, the luma range that needs to spend more codewords for its corresponding image-content to be reconstructed needs a higher dLUT value compared to other luma ranges. Additionally, the dLUT may be based on image statistics such that the codewords are allocated in a way that removes banding.

In some embodiments, a Gaussian curve is selected as the dLUT. Such a dLUT is defined as:

$$\bar{\delta}_p(v) = e^{-k_G\left(\frac{v}{N_v} - \mu_G\right)^2}$$

Figure 6A:
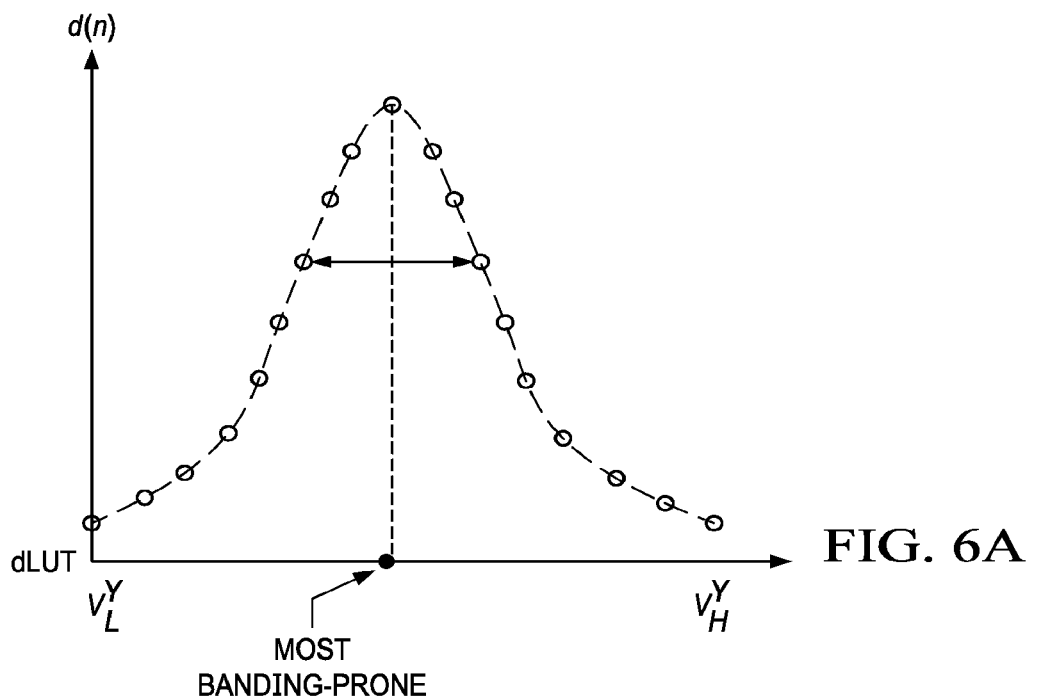
FIGS. 6A-6F depict example forward reshaping functions and corresponding differentials.
Figure 6B:
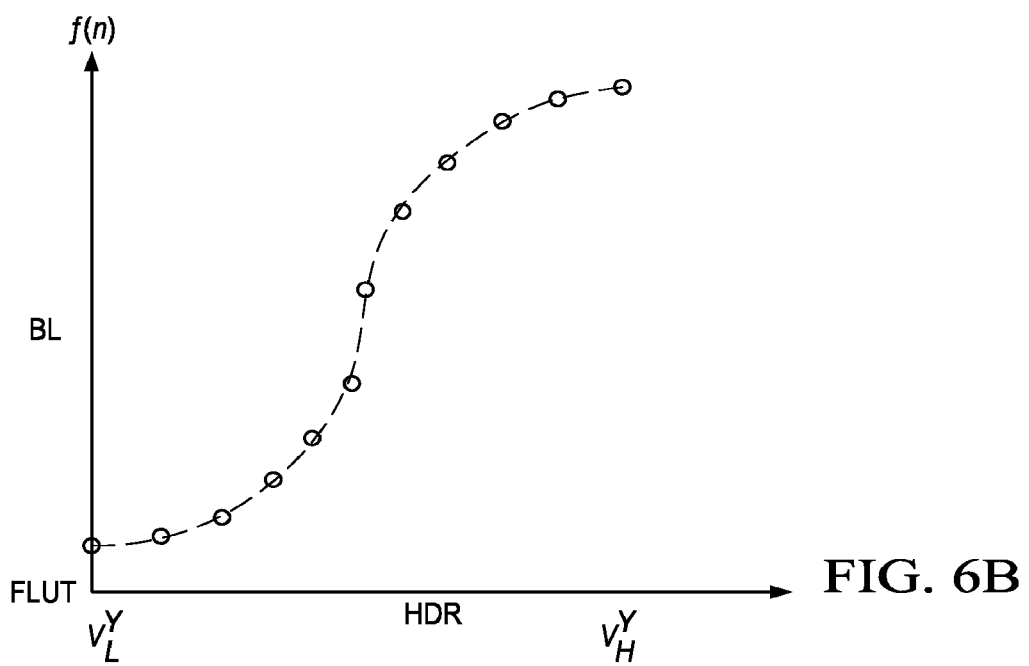

FIGS. 6A-6E illustrate several examples of dLUT and their corresponding FLUT. The peak of each dLUT is at the most banding-prone luminance ranges. As seen in FIG. 6A, the Gaussian curve is constructed using some ($\mu_G$, $k_G$) values. Equation 6 is applied to the dLUT of FIG. 6A to construct the FLUT shown in FIG. 6B. In the example of FIG. 6A, the Gaussian curve has its peak value at $\mu_G$ and the "sharpness" of the peak is determined by the parameter $k_G$. The mean is near the center of the $v_L^Y$ and $v_H^Y$ values. The dLUT and FLUT of FIGS. 6A-6B are suitable for mid-tone banding prevention, since the mid-tone gets a higher number of codewords than any other range for having a higher dLUT value.

Figure 6C:
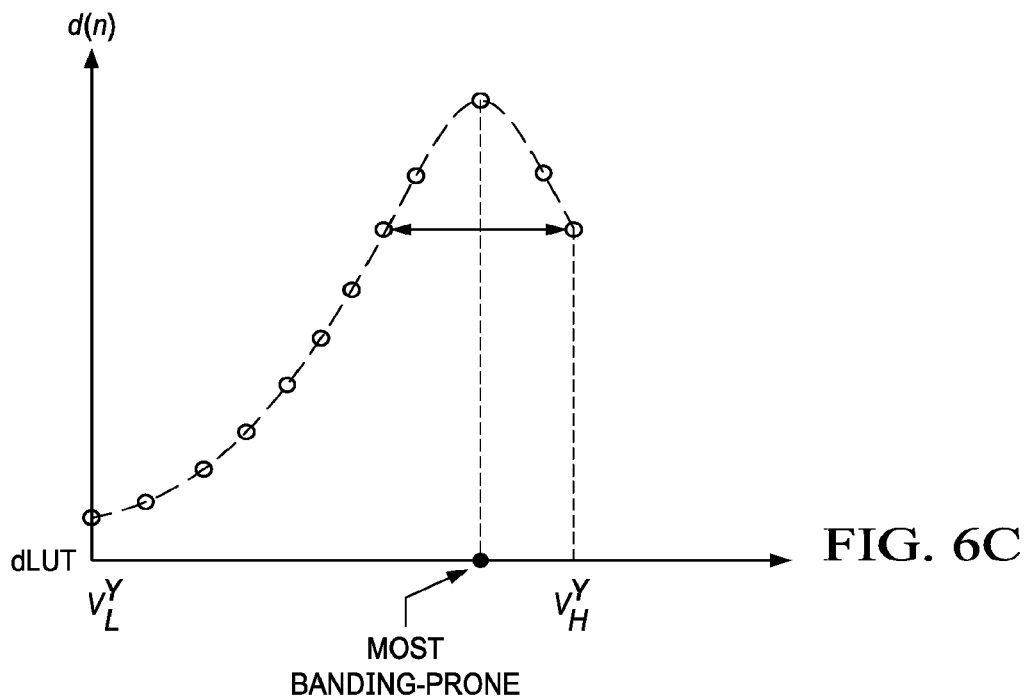
Figure 6D:
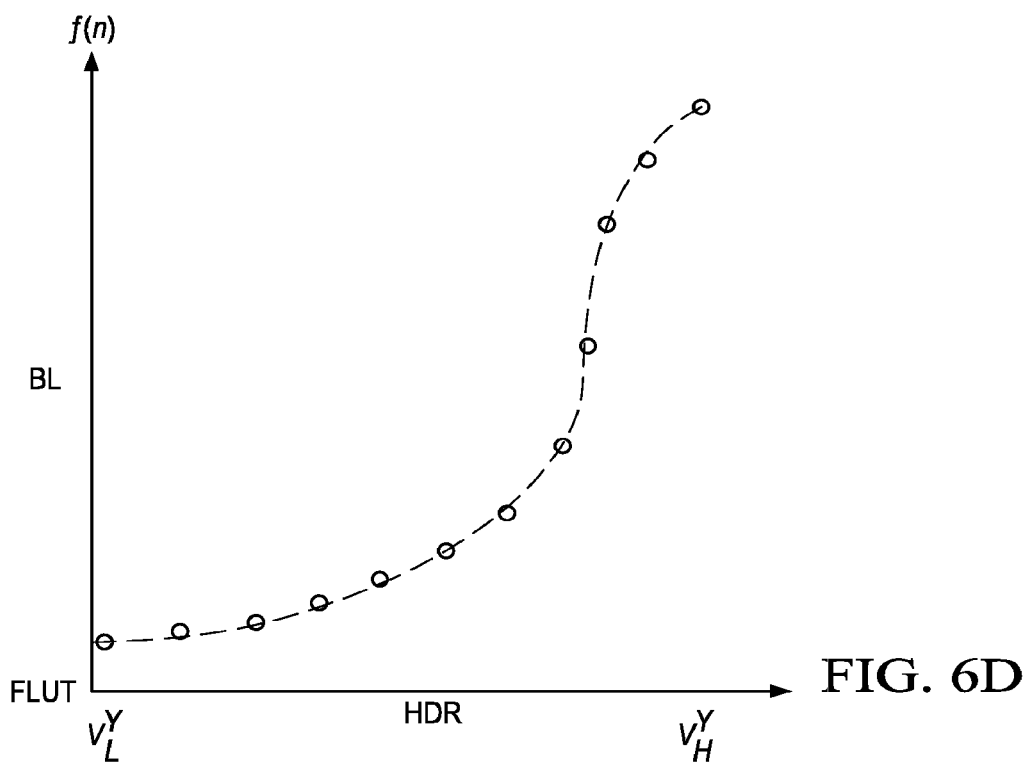

Shifting the mean towards $v_H^Y$ while keeping the $k_G$ constant results in the dLUT of FIG. 6C. In the corresponding FLUT, illustrated in FIG. 6D, a higher luminance range is given more codewords compared to the FLUT of FIG. 6B. Thus, locating the most banding prone luminance range in an image and setting the Gaussian function peak ($\mu_G$) in that range provides additional codewords where they are needed.

Figure 6E:
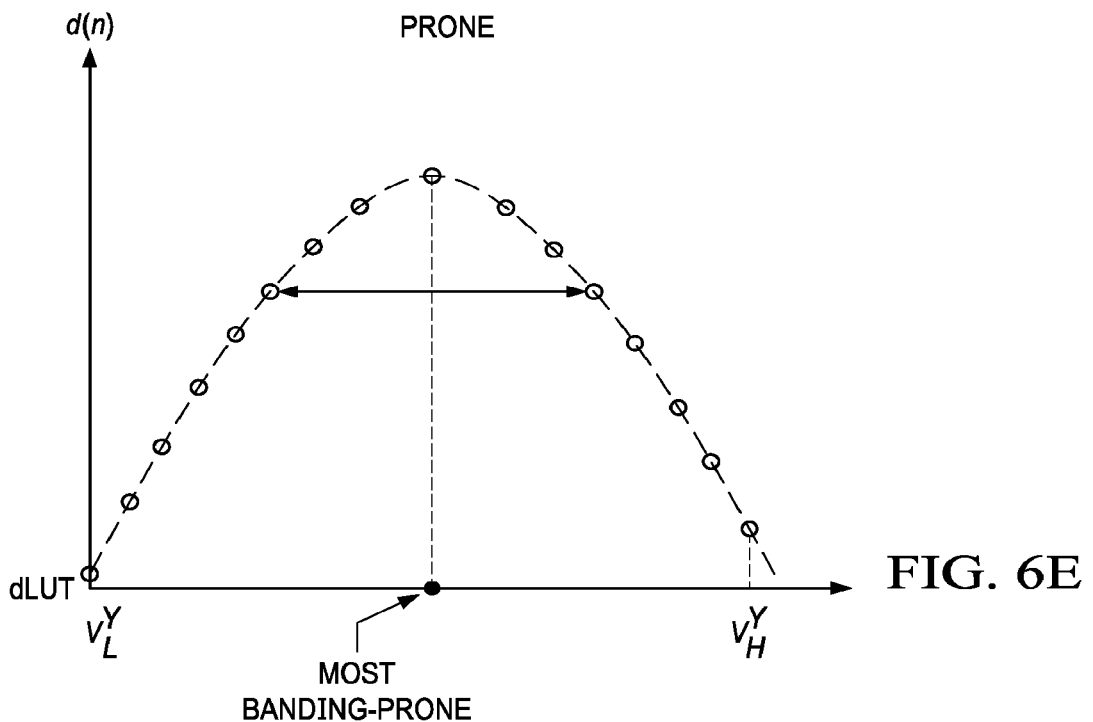
Figure 6F:
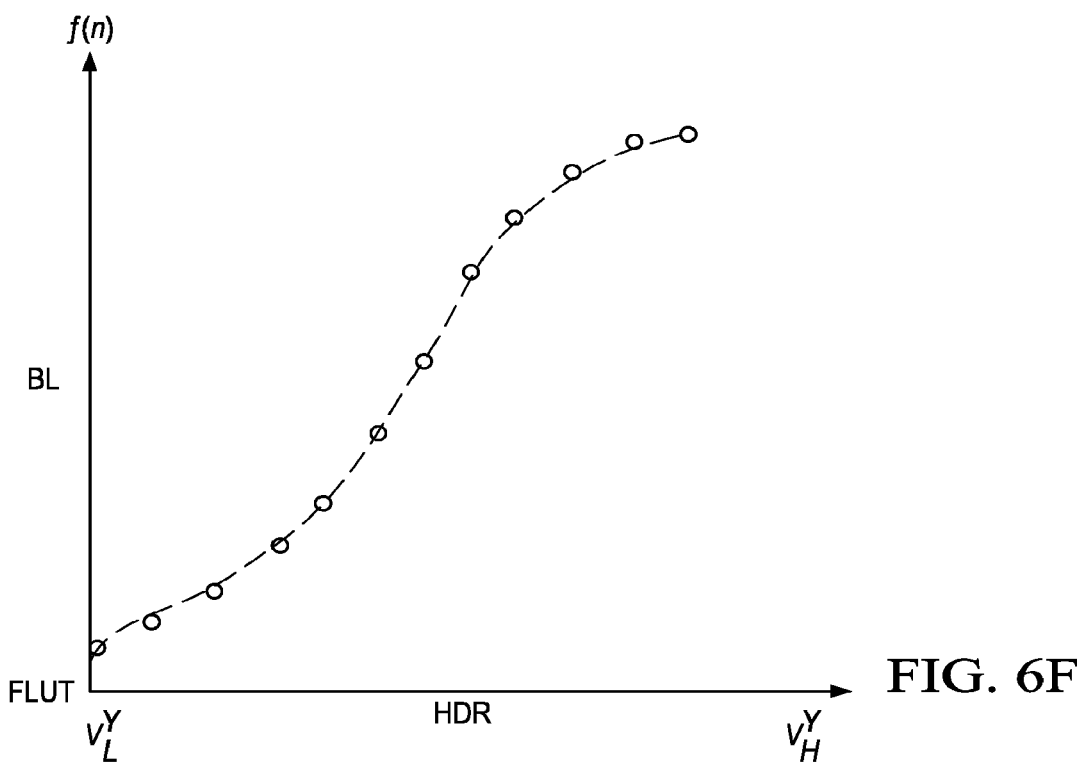

If the $k_G$ parameter is lowered, the Gaussian curve becomes more "flat" around its peak, as shown in the dLUT of FIG. 6E. This means if the banding-prone content is well-distributed near the most banding-prone bin, the use of a lower value of $k_G$ spreads the codewords over a larger range in the FLUT of FIG. 6F. On contrast, if the $k_G$ parameter is increased, the peak of the Gaussian curve becomes "sharper". The dLUT function tapers down quickly on both sides of the peak, and the most banding-prone bin gets significantly more codewords than its neighbors. In summary, the non-linearity of the FLUT is based on the underlying parameterized Gaussian curve. The parameters of the Gaussian curve may be selected using image statistics, as described in more detail below.

Luma and Chroma Reshaping Functions

Figure 7:
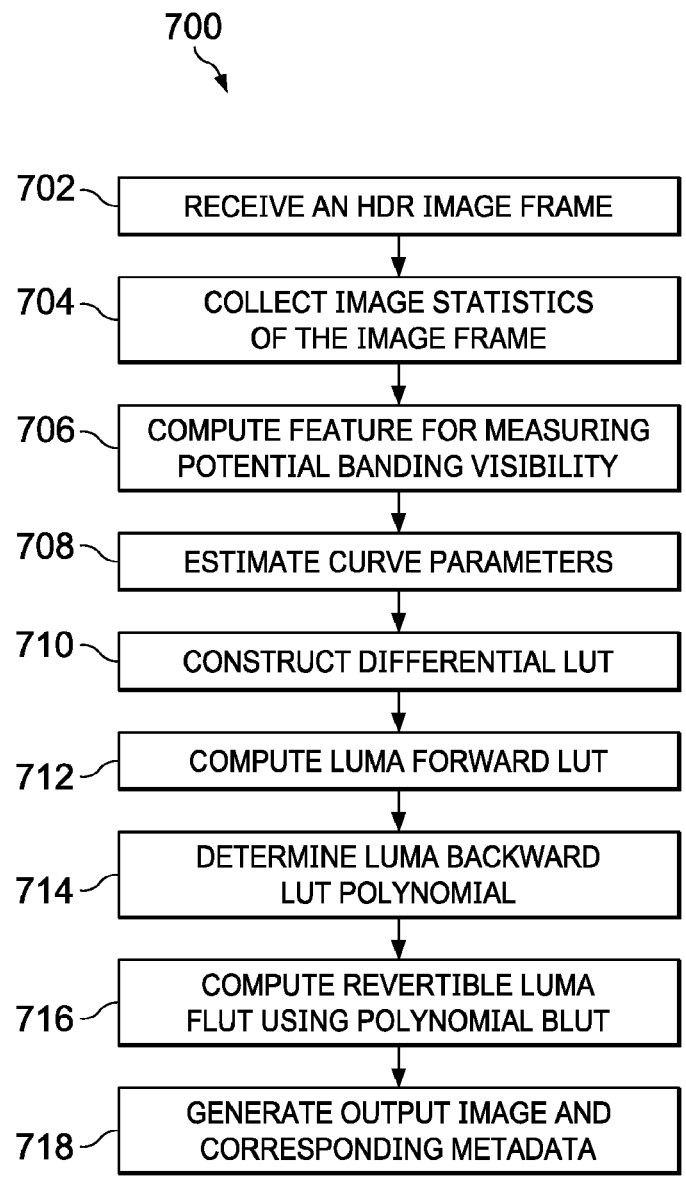
FIG. 7 depicts an example method performed by the encoder of FIG. 2.

As described above, a content-based non-linear luma reshaping function may be generated using Gaussian-dLUT curves. The backward reshaping metadata is approximated in the form of an 8-piece 1$^{st}$ order polynomial curve. FIG. 7 illustrates a method (700) for determining the luma reshaping algorithm. The method (700) may be performed by the encoder (200). At step (702), the encoder (200) receives an HDR image frame. The image frame may be a single image frame included in HDR video data.

At step (704), the encoder (200) collects image statistics from the input HDR image. The image statistics may include the minimum and maximum pixel values from luma and chroma channels of the input HDR image ($v_L^Y$, $v_H^Y$), ($v_L^{Cb}$, $v_H^{Cb}$), and ($v_L^{Cr}$, $v_H^{Cr}$). In some implementations, the image statistics includes letterbox detection in which the letterbox or pillarbox in an image is identified. The start and end rows of "active"-content (non-letterbox) as ($r_{min}^v$, $r_{max}^v$), and the columns as ($c_{min}^v$, $c_{max}^v$), using a letterbox-detection algorithm. Additionally, an average block-based standard deviation (BLKSTD($\bar{\sigma}_b^{Y,avg}$)) and a block-processed luma histogram (BLKHIST ($h_b^Y$)) may be computed in luma codeword-intervals (bins).

Processing blockwise pixels reduces needed computations compared to a pixel-by-pixel approach. For blockwise pixels, let the entire HDR luma codeword range be divided into non-overlapping $N_B$ codeword-intervals (bins), b=0, 1, . . . . $N_B$−1. Each such interval is a luma bin containing $$\frac{N_v}{N_B}$$

codewords. $N_v$ must be a multiple of $N_B$. For example, $N_B$=64 for $\eta_v$=16 bit-depth signal means each luma bin contains $$\frac{N_v}{N_B} = \frac{65536}{64} = 1024$$

HDR codewords. Let $v_{b,c}^Y$ be the HDR codeword at the center of bin b and $\bar{v}_{b,c}^Y$ be the normalized HDR codeword [0,1).

$$v_{b,c}^Y = \text{round}\left[(b + 0.5)\frac{N_v}{N_B}\right] \text{ and } \bar{v}_{b,c}^Y = \frac{v_{b,c}^Y}{N_v} \quad \text{[Equation 11]}$$

Let the non-letterbox (active content) part of the luma image be indexed by rows: ($r_{min}^v$, $r_{max}^v$) and columns: ($c_{min}^v$, $c_{max}^v$), and be divided into non-overlapping square pixel-blocks of ($\omega_B \times \omega_B$) pixels. A k'th block is indicated by $B_k$, the set of pixel-indices in that block. Blockwise computations begin from ($r_{min}^v$, $C_{min}^v$) and ignore any partial-block pixels near the boundary towards right columns and bottom rows to avoid letterbox content. For example, an HD (1920× 1080) image has active content between: ($r_{min}^v$, $r_{max}^v$)=(91, 990) and ($c_{min}^v$, $c_{max}^v$)=(0,1919), as indicated by letterbox detection. Beginning from (0, 91) as our first pixel of first block, the encoder (200) proceeds in raster-scan order to compute blockwise statistics. There $$\Omega_B = \left(\left\lfloor\frac{c_{max}^v - c_{min}^v + 1}{\omega_B}\right\rfloor \cdot \left\lfloor\frac{r_{max}^v - r_{min}^v + 1}{\omega_B}\right\rfloor\right)$$

such blocks, where $\lfloor \cdot \rfloor$ is floor operation. Note that $\omega_B$ is small enough (e.g. 16) as compared to image dimensions, such that the number of boundary pixels that are not considered in any block is negligible as compared with either W or For each block k (k=0,1, . . . , $\Omega_B$−1), the mean ($\bar{\mu}_k^v$) and standard deviation ($\bar{\sigma}_k^v$) are computed in the normalized-domain of its luma pixel values according to:

$$\bar{\mu}_k^v = \frac{1}{\omega_B^2}\sum_{i \in B_k} v_i^Y, \bar{\sigma}_k^v = \sqrt{\frac{1}{\omega_B^2}\sum_{i \in B_k}(v_i^Y - \bar{\mu}_k^v)^2} \quad \text{[Equation 12]}$$

The corresponding luma bin index $b_k$ of the block-mean is:

$$b_k = \lfloor \bar{\mu}_k^v \cdot N_B \rfloor \qquad \text{Equation 13}$$

The BLKHIST is computed by counting the number of pixels that have block-mean bin index b:

$$h_b^Y = \Sigma_{\forall k \ s.t. b_k = b} \omega_B^2 \qquad \text{[Equation 14]}$$

Figure 8A:
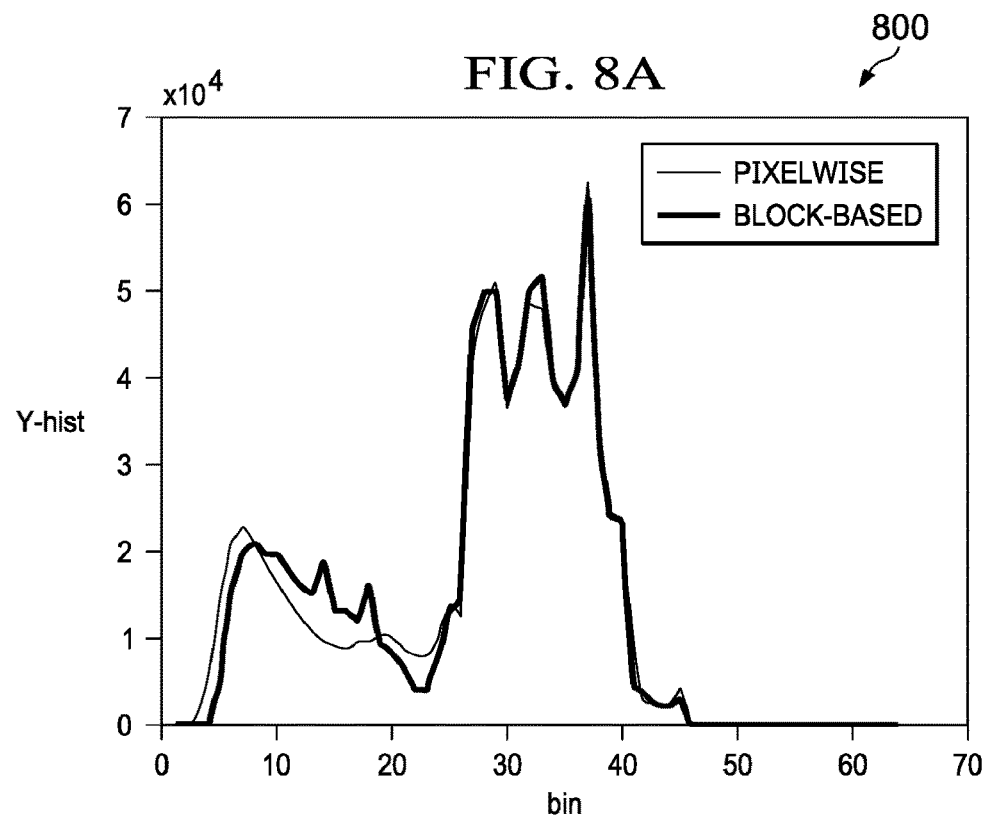
FIG. 8A and FIG. 8B depict example graphs comparing pixelwise and block-based image statistics.
Figure 8B:
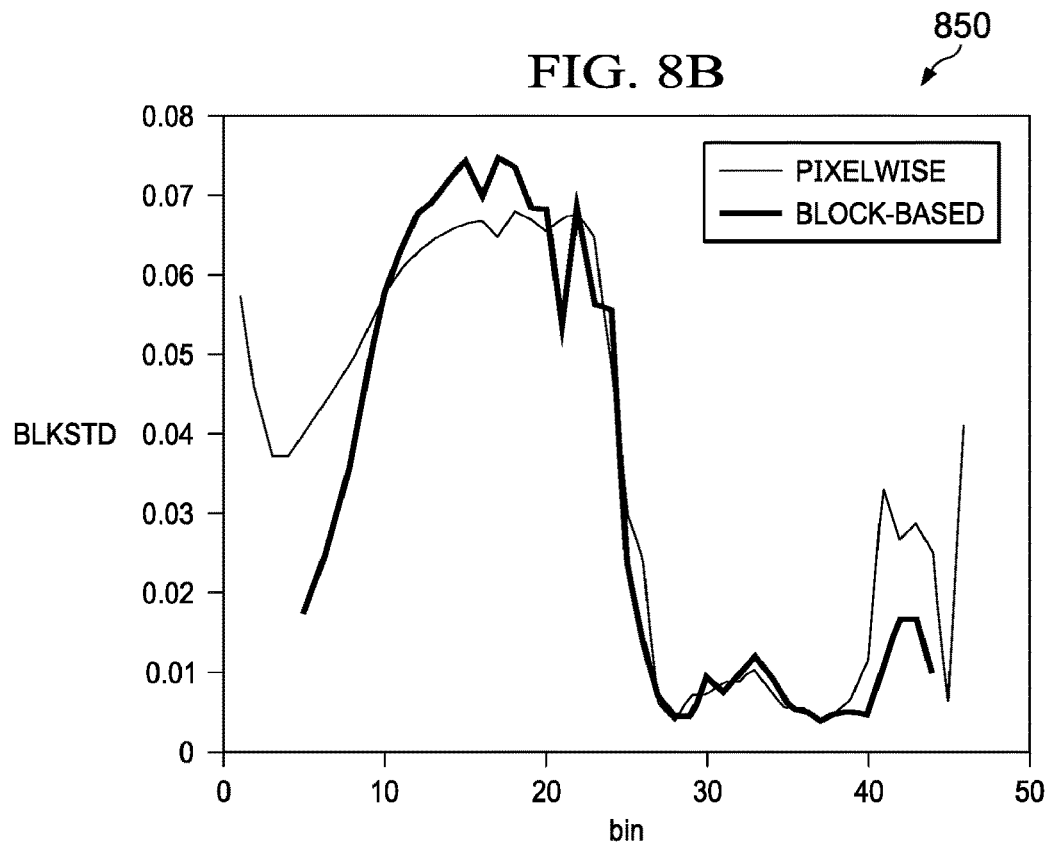

Using block-based image statistics over pixel image statistics saves on computations at a negligible loss of accuracy. FIG. 8A, for example, illustrates a graph (800) comparing a pixelwise histogram and the BLKHIST. Similarly, FIG. 8B illustrates a graph (850) comparing a pixelwise standard deviation and the BLKSTD.

As one particular example of performing statistics collections, the following pseudocode is presented using a C-like format:

```
// Collect (v_L^Y,v_H^Y), (v_L^Cb,v_H^Cb), (v_L^Cr,v_H^Cr) for given HDR image
// Init v_L^Y = v_L^Cb = v_L^Cr = N_v - 1, v_H^Y = v_H^Cb = v_H^Cr = 0, h_b^Y = σ̄_b^Y,avg = 0, b = 0,1, ... , N_B - 1
// Assign temporary variables: v_temp^Y, μ̄_k^v, v_sqr^Y, σ̄_k^v, b_k
// luma min/max
for (i = 0; i < W*H; i ++){
    if (v_i^Y < v_L^Y)
        v_L^Y = v_i^Y;
    if (v_i^Y > v_H^Y)
        v_H^Y = v_i^Y;
}
// chroma min/max (4:2:0 subsampled format)
for (i = 0; i < W*H / 4; i ++){
    if (v_i^Cb < v_L^Cb)
        v_L^Cb = v_i^Cb;
    if (v_i^Cb > v_H^Cb)
        v_H^Cb = v_i^Cb;
    if (v_i^Cr < v_L^Cr)
        v_L^Cr = v_i^Cr;
    if (v_i^Cr > v_H^Cr)
        v_H^Cr = v_i^Cr;
}
// luma features: BLKSTD and BLKHIST
for( x = r_min^v; x <= (r_max^v - ω_B) ; x+=ω_B) {
    for( y = c_min^v ; y <= (c_max^v - ω_B) ; y +=ω_B) {
        //initialize mean and sum square of the block k
        μ̄_k^v = 0.0f;
        v_sqr^Y = 0.0f;
        //Compute mean value and std of the block: pixel accessed by raster scan
        for( n = 0; n < ω_B; n++ ) {
            for( m = 0 ; m < ω_B; m++ ) {
                // record normalized luma pixel value
                v_temp^Y = v_(x+n)* W + (y+m)^Y / N_v;
                // record stats for BLKSTD
                μ̄_k^v += v_temp^Y;
                v_sqr^Y += v_temp^Y * v_temp^Y;
            }
        }
        // compute block mean and standard deviation
        μ̄_k^v /= ω_B * ω_B;
        σ̄_k^v = sqrt (v_sqr^Y / (ω_B * ω_B) - μ̄_k^v* μ̄_k^v);
        //accumulate data into respective bin b_k
        b_k = floor[μ̄_k^v.N_B];
        h_{b_k}^Y += (ω_B * ω_B);
        σ̄_{b_k}^Y,avg += (ω_B * ω_B) * σ̄_k^v;
    }
}
// compute avg std dev in hist bin
for ( b = 0; b < N_B; b++ ) {
    if (h_b^Y )
        σ̄_b^Y,avg = σ̄_b^Y,avg / h_b^Y;
    else
        σ̄_b^Y,avg = INVALID;
}
```

BLKSTD is computed in all bins b where $h_b^Y \neq 0$ by averaging the standard deviation over all blocks that have block-mean bin index b:

$$\bar{\sigma}_b^{Y,avg} = \frac{1}{h_b^Y} \sum_{\forall k \ s.t. b_k = b} (\omega_B^2 \cdot \bar{\sigma}_k^v) \qquad \text{[Equation 15]}$$

For bins where $h_y^Y = 0$, the BLKSTD $\sigma_b^{Y,avg}$ is given a value of INVALID.

Returning to FIG. 7, at step (706), the encoder (200) computes a feature that measures potential banding visibility in each luma bin. Generally, high-texture or noisy region of images have low banding visibility due to the masking effect. The BLKSTD functions as a measure of such signal smoothness, such that if BLKSTD is lower in some luma bin, the regions coded using those luma codewords are more smooth compared to regions coded with different luma codewords. Thus, a lower BLKSTD may indicate higher banding visibility. Accordingly, the computed feature should be inversely related to the BLKSTD. Additionally, banding over a larger region is more noticeable and annoying to a viewer of the HDR video content. Therefore, a higher BLKHIST results in higher chances of noticeable banding. Accordingly, the computed feature should be directly related to the BLKHIST. Thus, both the BLKSTD and the BLKHIST function as inputs to predict banding risk in each bin.

A banding indicator unit may be constructed using a multiplicative combination of BLKSTD and BLKHIST. For example, let $\sigma_p$ be the predicted banding risk in bin $b=0,1,\ldots,N_B-1$:

$$\varphi_b = \begin{cases} \dfrac{h_b^Y}{\overline{\sigma}_b^{Y,avg}} & \text{if } h_b^Y \neq 0 \\ 0 & \text{if } h_b^Y = 0 \end{cases} \qquad \text{[Equation 16]}$$

If $h_b^Y = 0$ for some bin, then there are no pixels in that bin, and banding risk is 0. This indicator considers the effects of two features to indicate banding risk in larger areas of image. Since $\overline{\sigma}_b^{Y,avg}$ is in the denominator and if it is 0 for some bin, we need to set it to a small $\overline{\sigma}_b^{Y,min}$ value to avoid divide-by 0. Thus, we floor it to a $\sigma_b^{Y,min}$. With this, the normalized risk ($\overline{\varphi}_b$) is:

$$\overline{\varphi}_b = \dfrac{\varphi_b}{\sum_{b=0}^{N_B-1} \varphi_b} \qquad \text{[Equation 17]}$$

Where a higher value of ($\overline{\varphi}_b$) indicates a higher proclivity to visible banding.

As one particular example of determining banding risk, the following pseudocode is presented using a C-like format:

```
// Init φsum = 0, b = 0,1, ... , NB – 1
// Use σ̄bY,min = 1 / ωB2
// compute risk
for (b = 0; b < NB; b ++ ) {
    if (hby > 0)
        // set up a minimum BLKSTD based on 1 pixel different in ωB * ωB block
        if (σ̄bY,avg < σ̄bY,min)
            σ̄bY,avg < σ̄bY,min;
        // compute risk using BLKHIST and BLKSTD
        φb = hby/ σ̄bY,avg;
        φsum = φb;
    }
    else {
        φb = 0;
    }
}
// normalize risk
if (φsum) {
    for (b = 0; b < NB; b ++ )
        φ̄b = φb / φsum;
    }
}
```

At step (708), the encoder (200) determines curve parameters for the earlier-defined Gaussian function. The Gaussian curve parameters include $\mu_G$ and $k_G$. The Gaussian function has a maximum value (or peak) at its mean $\mu_G$. The peak location of the banding risk across all luma bins is identified and set as the mean $\mu_G$. Let $\overline{\varphi}^{peak}$ be the peak normalized risk value with $b_{\overline{\varphi}}^{peak}$, the corresponding bin index.

$$\overline{\varphi}^{peak} = \max_b(\overline{\varphi}_b) \text{ and } b_{\overline{\varphi}^{peak}} = \operatorname*{argmax}_b(\overline{\varphi}_b) \qquad \text{[Equation 18]}$$

The normalized bin-center codeword is set as the mean of the Gaussian function, as previously described with respect to Equation 11.

$$\mu_G = v_{b_{\overline{\varphi},peak,c}}^Y \qquad \text{[Equation 19]}$$

The parameter $k_G$ determines the shape of the Gaussian bell-curve and is computed as a number between ($k_{G,min}$, $k_{G,max}$), using the peak-bin index $b_{\overline{\varphi}peak}$ and its $w_{k_G}$ neighboring bins on each side. Let ($b_{\overline{\varphi}peak}^{left}$, $b_{\overline{\varphi}peak}^{right}$) be the leftmost and rightmost bins that are $w_{k_G}$ bins away from the peak bin $b_{\overline{\varphi}peak}$ in either direction.

$$b_{\overline{\varphi}peak}^{left} = \max(b_{\overline{\varphi}peak} - w_{k_G}, 0) \text{ and } b_{\overline{\varphi}peak}^{right} = \max(b_{\overline{\varphi}peak} + w_{k_G}, N_B - 1) \qquad \text{[Equation 20]}$$

The sum of risk in this window ($\overline{\varphi}_{winsum}^{peak}$) is:

$$\overline{\varphi}_{winsum}^{peak} = \sum_{b=b_{\overline{\varphi}peak}^{left}}^{b_{\overline{\varphi}peak}^{right}} \overline{\varphi}_b \qquad \text{[Equation 21]}$$

$$k_G = k_{G,min} + (k_{G,max} - k_{G,min})\overline{\varphi}_{winsum}^{peak}$$

Where $\varphi_{winsum}^{peak}$ indicates the combined banding risk within a luminance range centered at the peak. If $\overline{\varphi}_{winsum}^{peak}$ is higher, the probability of banding is higher, and more codewords are assigned within this range. When $\varphi_{winsum}^{peak}$ is higher, a smaller standard deviation of the Gaussian curve in terms of dLUT may be selected to narrow the Gaussian curve. Whereas, if $\overline{\varphi}_{winsum}^{peak}$ is smaller, a larger standard deviation of the Gaussian curve in terms of dLUT may be selected to widen the Gaussian curve.

As one particular example of determining Gaussian curve parameters, the following pseudocode is presented using a C-like format:

```
// compute Gaussian curve parameters: μG and kG
φ̄peak =φ̄winsumpeak= 0.0f;
bφ̄peak = round[NB/2];
for (b = NB – 1; b > 0; b— ) { // ignore darkest bin
    if (φ̄b > φ̄peak){
        φ̄peak = φ̄b;
        bφ̄peak = b;
```

-continued

```
    }
}
// find mid-codeword of peak bin
```

$$\bar{v}_{cb_{\overline{\varphi}peak}}^{Y} = CLIP3\left\{\left(\frac{b_{\overline{\varphi}peak} + 0.5}{N_B}\right), \bar{v}_L^Y, \bar{v}_H^Y\right\};$$

$$\mu_G = \bar{v}_{c,b_{\overline{\varphi}peak}}^{Y}$$

```
// compute Gaussian curve parameter k_G
for (d = -w_{k_G}; d <= w_{k_G}; d ++ ){
    b = CLIP3{b_{\overline{\varphi}peak} + d, 0, N_B - 1}
    \overline{\varphi}_{winsum}^{peak} += \overline{\varphi}_b;
}
k_G = k_{G,min} + (k_{G,max} - k_{G,min}) * \overline{\varphi}_{winsum}^{peak};
```

In this example, CLIP3{a, b, c} means the signal a is clipped to be in between [b,c].

$$\ddot{T}_Y^{F,C}(i) = \begin{cases} 0 & \text{if } i < \text{floor}\left\lfloor N_C \frac{v_L^Y}{N_v}\right\rfloor \\ \tilde{T}_Y^{F,C}(i) - \tau_Y^{\Delta,min} & \text{if } \text{floor}\left\lfloor N_C \frac{v_L^Y}{N_v}\right\rfloor \leq i \leq \text{ceil}\left\lfloor N_C \frac{v_H^Y}{N_v}\right\rfloor \\ \tilde{T}_Y^{F,C}\left(\text{ceil}\left\lfloor N_C \frac{v_H^Y}{N_v}\right\rfloor\right) - \tau_Y^{\Delta,min} & \text{if } i > \text{ceil}\left\lfloor N_C \frac{v_H^Y}{N_v}\right\rfloor \end{cases}$$ [Equation 26]

At step (710) the encoder (200) constructs the dLUT. A pointwise dLUT denoted by $\delta_Y(\cdot):[0,1)\rightarrow[0,1]$ is constructed at $N_C$ number of equidistant "compute-points" $x_i$, $i=0,1,\ldots N_C-1$, using Gaussian curve with parameters: $\mu_G$, $k_G$.

$$x_i = \frac{(i + 0.5)}{N_C} = (i + 0.5)\pi_C, i = 0, 1, \ldots N_C - 1$$ [Equation 22]

Setting $N_C<N_v$ significantly saves computations e.g. in case of 16-bit content. $N_C=4096$ compute-points i.e 12-bit granularity are used instead of full $N_v=65536$ actual codewords. Here, $$\pi_C = \frac{1}{N_C}$$

is normalized stride for compute-points. $N_C$ needs to be a factor of $N_v$.

$$\delta_Y(i) = \max(e^{-\{k_G(x_i-\mu_G)^2\}}, \delta_{Y,MAX}) \text{ for } i=0,1,\ldots,N_C-1,$$ [Equation 23]

Where $\delta_{Y,MAX}$ is minimum value imposed on dLUT.

Figure 9:
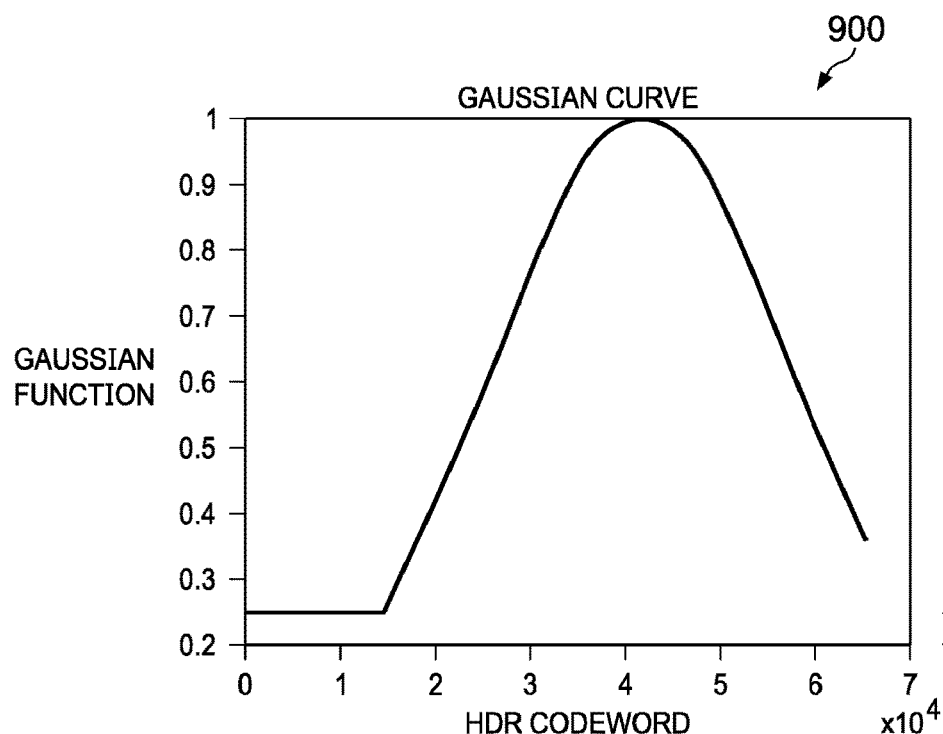
FIG. 9 depicts an example Gaussian function with a floor value.

Setting $\delta_{Y,MAX}$ ensures any luma range receives at least some minimum number of codewords, as a purely curve-based function may not account for ensuring each luma range receives codewords otherwise. FIG. 9 provides a graph (900) showing a Gaussian curve with parameters $\mu_G=0.7$, $k_G=8$, and having a floor value of $\delta_{Y,MAX}=0.25$.

Returning to FIG. 7, at step (712), the encoder (200) computes the luma FLUT based on the dLUT. An intermediate luma FLUT $\tilde{T}_Y^{F,C}(\cdot)$ is first obtained and defined at compute points $x_i$, $i=0,1,\ldots N_{=C}+1$ using below equation:

$$\tilde{T}_Y^{F,C}(i) = \begin{cases} \delta_Y(0) & \text{if } i = 0 \\ \tilde{T}_Y^{F,C}(i - 1) + \delta_Y(i) & \text{if } 0 < i < N_C \end{cases}$$ [Equation 24]

Equation 24 defines a curve at $N_C$ points that maps the entire HDR codeword range to a real-number range. To construct a normalized FLUT $\bar{T}_Y^{F,C}(\cdot)$ from $\tilde{T}_Y^{F,C}(\cdot)$ for the input HDR image, the relevant piece of the curve that maps $[v_L^Y, v_H^Y]$ to the entire normalized BL codeword range $[0,1)$ is identified according to the following:

i) Obtain the value corresponding to $v_L^Y$ as minimum offset $\tau_Y^{\Delta,min}$:

$$\tau_Y^{\Delta,min} = \tilde{T}_Y^{F,C}\left(\text{floor}\left\lfloor N_C \frac{v_L^Y}{N_v}\right\rfloor\right)$$ [Equation 25]

ii) Form an un-normalized function $\ddot{T}_Y^{F,C}(\cdot)$ at compute points by offsetting by $\tau_Y^{\Delta,min}$:

iii) Obtain the value corresponding to $v_H^Y$ from $\ddot{T}_Y^{F,C}$:

$$\tau_Y^{\Delta,max} = \ddot{T}_Y^{F,C}\left(\text{ceil}\left\lfloor N_C \frac{v_H^Y}{N_v}\right\rfloor\right)$$ [Equation 27]

iv) Normalize the function to [0,1]:

$$\bar{T}_Y^{F,C}(i) = \frac{\ddot{T}_Y^{F,C}(i)}{\tau_Y^{\Delta,max}}$$ [Equation 28]

Figure 10:
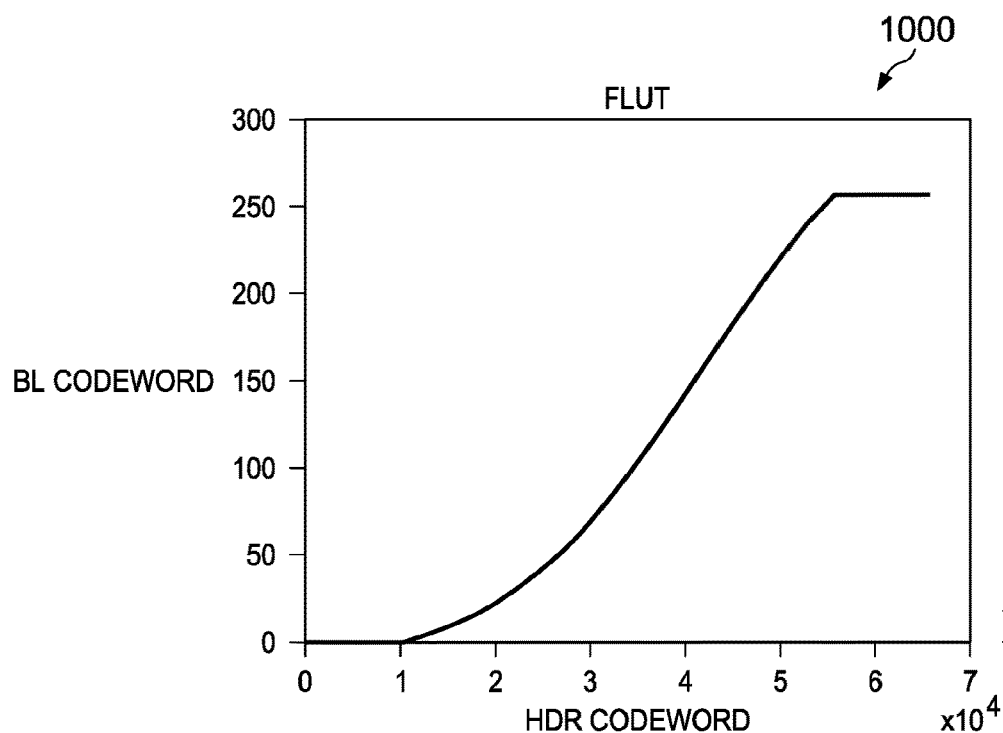
FIG. 10 depicts an example forward reshaping function using a Gaussian curve differential.

FIG. 10 provides a graph (1000) illustrating an exemplary FLUT generated using a Gaussian-curve dLUT. Graph (1000) shows $T_Y^{F,C}(\cdot)$ using $\bar{T}_Y^{F,C}(\cdot)$ for $N_s=256$ i.e. 8-bit BL:

$$T_Y^{F,C}(i) = \text{round}[(N_s-1)\cdot\bar{T}_Y^{F,C}(i)]$$ [Equation 29]

In the example of graph (1000), $v_L^Y=10000$ and $v_H^Y=55536$. Accordingly, the resulting FLUT did not allocate any codewords to $v<v_L^Y$ and $v_H^Y$. As one particular example of obtaining dLUT and FLUT at compute-points, the following pseudocode is presented using a C-like format:

```
// compute dLUT and FLUT for full range at N_C compute-points
// 0th compute-point
π_c = 1/Nc;
x_0 = 0.5 * π_C;
T_Y^{F,C}(0) = max(e^{-{k_G(x_0-μ_G)^2}}, δ_{Y,MAX})
// other compute points
for (i = 1; i < N_C; i++ ) {
    x_i = (i + 0.5 ) * π_C;
    δ_{temp} = max(e^{-{k_G(x_i-μ_G)^2}}, δ_{Y,MAX})
    T_Y^{F,C}(i) = T_Y^{F,C}(i - 1) + δ_{temp};
```

```
}
// norm FLUT
for (i = 0; i < N_C; i++ ) {
    T_Y^{F,C}(i) = Ṫ_Y^{F,C}(i)/Ṫ_Y^{F,C}(N_C - 1);
}
// Construct frame FLUT
```

$$v_L^{Y,C} = \text{floor}\left[N_C \frac{v_L^Y}{N_v}\right]$$

$$v_H^{Y,C} = \text{ceil}\left[N_C \frac{v_H^Y}{N_v}\right]$$

```
τ_Y^{Δ,min} = T̈_Y^{F,C}(v_L^{Y,C});
for ( i = 0; i < v_L^{Y,C}; i++ ) {
    T̈_Y^{F,C}(i) = 0;
}
for ( ; i <= v_H^{Y,C} ; i++ ) {
    T̈_Y^{F,C}(i) = max(T̈_Y^{F,C}(i) - τ_Y^{Δ,min}, 0);
}
for ( ; i < N_C; i++ ) {
    T̈_Y^{F,C}(i) = T̈_Y^{F,C}(v_H^{Y,C});
}
// Normalize frame FLUT
τ_Y^{Δ,max} = T̈_Y^{F,C}(v_H^{Y,C})
if (τ_Y^{Δ,max}) {
    for ( i = 0; i < N_C; i++ ) {
```

$$\tilde{T}_Y^{F,C}(i) = CLIP3\left(\frac{\ddot{T}_Y^{F,C}(i)}{\tau_Y^{\Delta,max}}, 0, 1\right);$$

```
    }
}
```

Returning to FIG. 7, at step (714), the encoder (200) determines the luma BLUT polynomial. The normalized BLUT ($T_Y^B$) is specified using an 8-piece polynomial where $\Omega^Y=8$. In some implementations, the BLUT has 9 pivot points: $\rho_0^Y, \rho_1^Y, \ldots, \rho_8^Y$, expressed as $\eta_s$-bit codewords. Each m'th polynomial piece has 3 coefficients: $a_0^{Y,m}, a_1^Y, a_2^{Y,m}$.

$$T_Y^B(\bar{s}) = a_0^{Y,m} + a_1^{Y,m}\bar{s} + a_2^{Y,m}(\bar{s})^2, m \text{ is such that} \rho_m^P < s \leq \rho_{m+1}^P \quad \text{[Equation 30]}$$

where s=round $[N_s \cdot \bar{s}]$ is some BL codeword.

To simplify computations over using jointly-designed pivot points and a $2^{nd}$ order polynomial, fixed pivot points at equal intervals and a $1^{st}$ order polynomial is used. The 9 pivot points are computed as:

$$\rho_l^Y = \text{round}\left[l\left(\frac{N_s}{\Omega^Y - 1}\right)\right], l = 0, 1, \ldots \Omega^Y - 1, \rho_{\Omega^Y}^Y = N_S - 1 \quad \text{[Equation 31]}$$

For example, for 8-bit BL, the 9 pivot points are 0, 32, 64, 96, 128, 160, 192, 224, and 255. The normalized pivot points are:

$$\bar{\rho}_l^Y = \frac{\rho_l^Y}{N_s - 1}, l = 0, 1, \ldots \Omega^Y - 1 \text{ and } \rho_{\Omega^Y}^Y = 1 \quad \text{[Equation 32]}$$

The corresponding mapping of the BL-domain points to HDR domain is computed using the normalized FLUT $\tilde{T}_Y^{F,C}(\cdot)$. Specifically, the start and end points of each 'th polynomial ($\bar{\rho}_l^Y, \bar{v}_{l,start}^Y$) and ($\bar{\rho}_{l+1}^Y, \bar{v}_{l,end}^Y$) respectively, $l=0,1, \ldots \Omega^Y-1$, where $\bar{v}_{l,start}^Y, \bar{v}_{l,end}^Y$ correspond to the minimum and maximum normalized HDR codewords to be mapped using l'th polynomial-piece. These polynomial pieces are continuous such that:

$$(\bar{\rho}_{l+1}^Y, \bar{v}_{l,end}^Y) = (\bar{\rho}_{l+1}^Y, \bar{v}_{l+1,start}^Y), l=0,1, \ldots \Omega^Y-2 \quad \text{[Equation 33]}$$

To compute the start points of all the polynomial pieces:

$$\bar{v}_{0,start}^Y = \bar{v}_L^Y \text{ and } \bar{v}_{\Omega^Y-1,end}^Y = \bar{v}_H^Y \quad \text{[Equation 34]}$$

since $\tilde{T}_Y^{F,C}:(\bar{v}_L^Y, \bar{v}_H^Y) \to [0,1]$.

Using the monotonically non-decreasing property of reshaping functions, for $l=1, \ldots \Omega^Y-1$:

$$\bar{v}_{l,start}^Y = \underset{\bar{v}}{\text{argmin}}\{\tilde{T}_Y^{F,C}(\bar{v})\} \text{ such that } \tilde{T}_Y^{F,C}(\bar{v}) \geq \bar{\rho}_l^Y \quad \text{[Equation 35]}$$

The end points for $l=0, \ldots \Omega^Y-2$ are:

$$\bar{v}_{l,end}^Y = \bar{v}_{l+1,start}^Y \quad \text{[Equation 36]}$$

and $\bar{v}_{\Omega^Y-1,end}^Y = \bar{v}_H^Y$.

Figure 11:
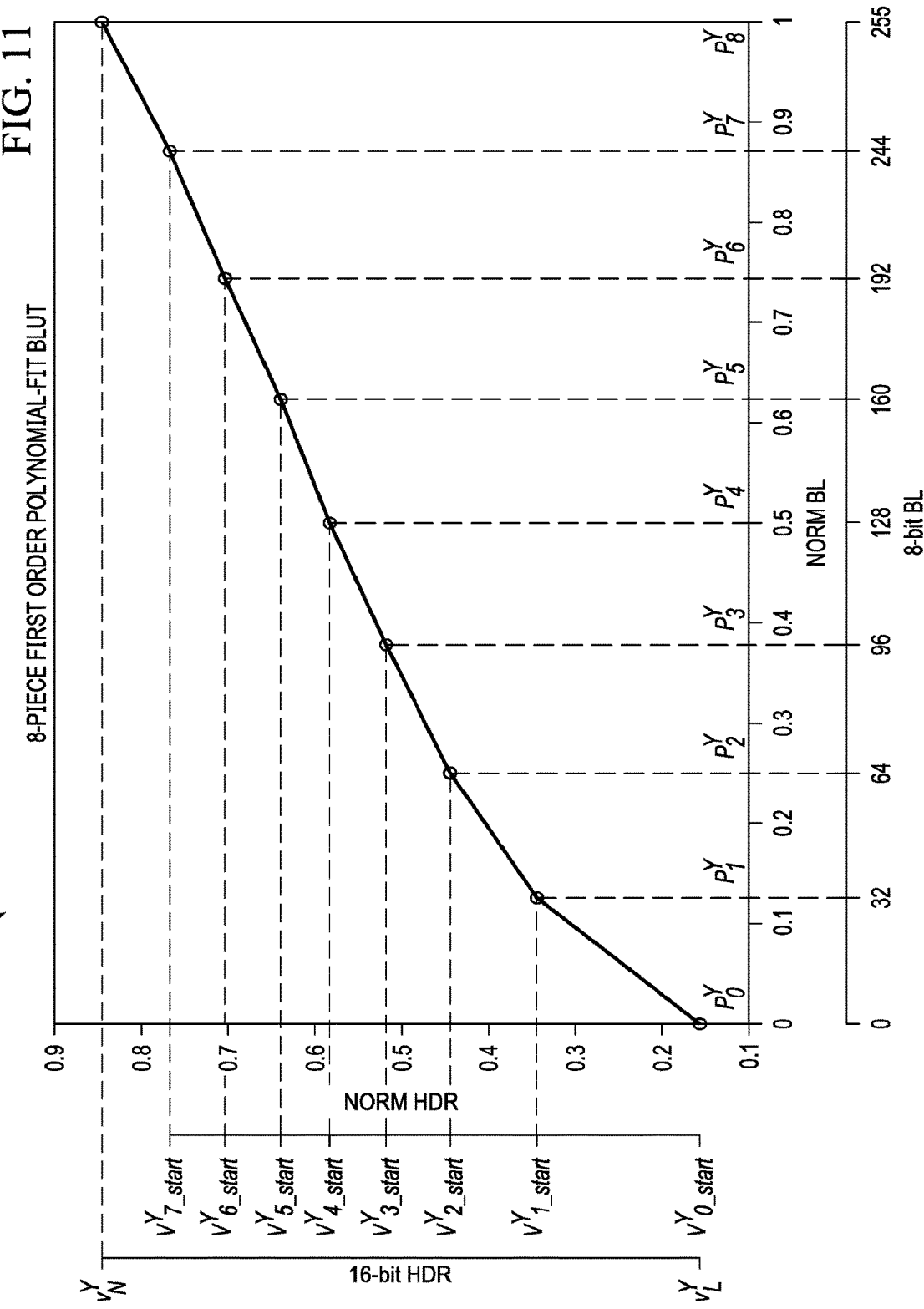
FIG. 11 depicts an example luma 8-piece first order polynomial-fit.

FIG. 11 provides a graph (1100) illustrating the process for the above luma 8-piece first order fitting for the BLUT. Once the start and end points of all polynomial pieces are established, a first order curve (e.g., a straight line) is constructed for each piece m=0,1,2, ..., $(\Omega^P-1)$, in the slope-intercept form using the two end-points of that line. The polynomial coefficients are:

$$a_1^{Y,m} = \left(\frac{\bar{v}_{m,end}^Y - \bar{v}_{m,start}^Y}{\bar{\rho}_{m+1}^Y - \bar{\rho}_m^Y}\right) \text{ and } a_0^{Y,m} = \bar{v}_{m,start}^Y - a_1^{Y,m}\bar{\rho}_m^Y \quad \text{[Equation 37]}$$

The BLUT is constructed using these 8 polynomial pieces. As one particular example for computing first-order BLUT coefficients, the following pseudocode is presented using a C-like format:

```
// estimate 1st order BLUT coeffs
// construct (Ω^Y + 1)-point BLUT T̂_Y^B(.)
T̂_Y^B(0) = v̄_L^Y;
v = v_L^{Y,C};
l = 1;
while ( l < Ω^Y ){
    while (T̃_Y^{F,C}(v) < (ρ̄_l^Y + 0.5/N_s)) {
        v++;
    }
    T̂_Y^B(l) = N_v * π_C;
    l++;
}
T̂_Y^B(Ω^Y) = v̄_H^Y;
for (m = 0; m < Ω^Y; m++) {
    // slope
    a_1^{Y,m} = (T̂_Y^B(m + 1) - T̂_Y^B(m)) / (ρ̄_{m+1}^Y - ρ̄_m^Y);
    // intercept
    a_0^{Y,m} = T̂_Y^B(m) - a_1^{Y,m} * ρ̄_m^Y;
}
```

Figure 12:
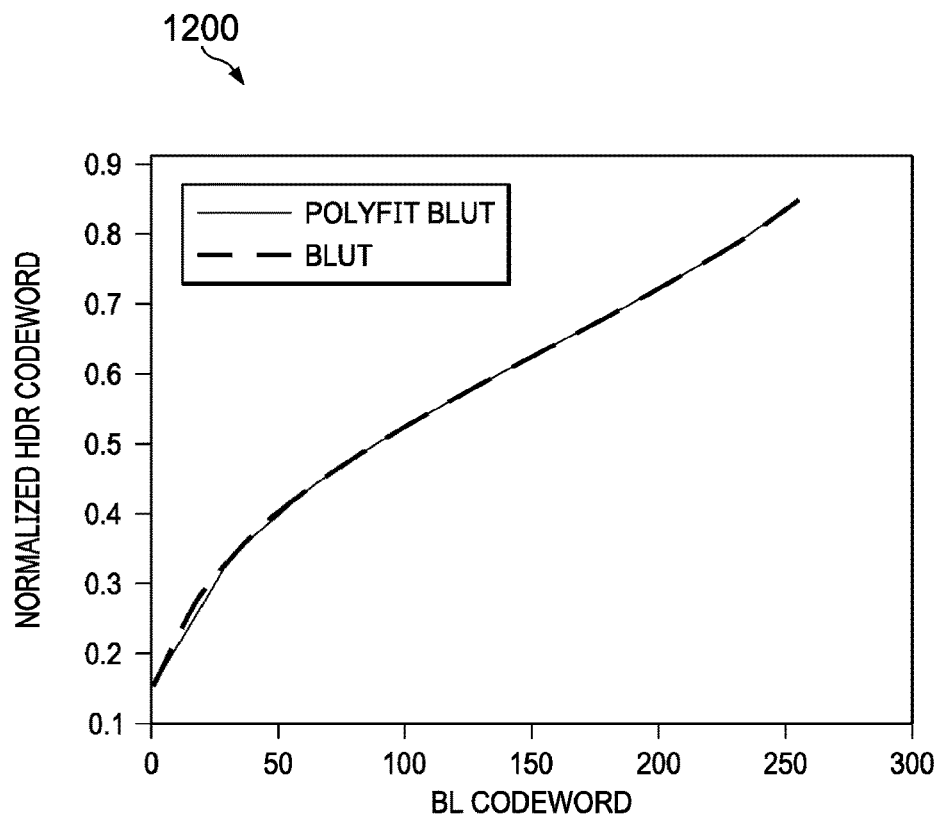
FIG. 12 depicts an example graph comparing a polyfit backwards look-up table to a compute-point backwards look-up table.
Figure 13:
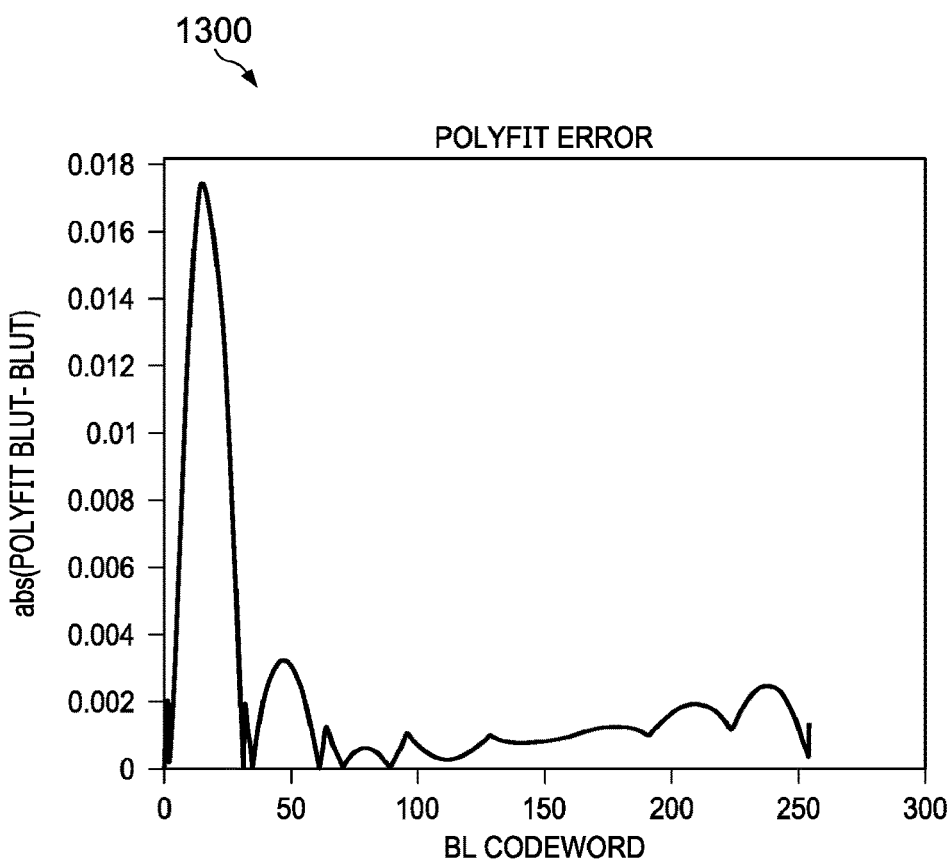
FIG. 13 depicts an example graph illustrating absolute error of a backward look-up table using an 8-piece $1^{st}$ order polynomial.

FIG. 12 provides a graph (1200) illustrating an 8-piece polyfit BLUT compared to a BLUT constructed at each compute-point by inverting a FLUT. FIG. 13 provides a graph (1300) illustrating the absolute error while approximating the BLUT curve using an 8-piece $1^{st}$ order polynomial using fixed pivot points.

Returning to FIG. 7, at step (716), the encoder (200) computes a revertible luma FLUT based on the polynomial BLUT. As seen in FIGS. 9 and 10, the 8-piece approximation BLUT slightly differs from a fully inverted BLUT, particularly in a lower codeword range. If the luma FLUT from step (712) is used to perform a forward reshaping operation and the polynomial approximation BLUT is used to perform a backward reshaping operation, the reconstructed HDR video data may appear different than the original HDR video data. Accordingly, a FLUT is constructed by inverting the polynomial approximation BLUT, referred to as a revertible FLUT. The revertible FLUT is capable of producing BL that can be used to reconstruct the HDR without any polynomial fitting error.

As illustrated in FIG. 11, the start and end points of the 8 polynomial pieces of BLUT maps the BL (x-axis) to HDR codewords (y-axis). An inverse function is constructed using the same pieces with those start and end points, but mapping from HDR to BL codewords. Accordingly, a revertible FLUT is constructed: $T_Y^F(\cdot):[0, N_v-1] \rightarrow [0, N_s-1]$:

$$T_Y^F(v) = \text{round}\left[(N_s - 1)\left\{b_1^{Y,m}\left(\frac{v}{N_v}\right) + b_0^{Y,m}\right\}\right], \quad \text{[Equation 37]}$$

$$m \text{ is such that } \bar{v}_{m,start}^Y \leq \left(\frac{v}{N_v - 1}\right) < \bar{v}_{m,end}^Y$$

Where:

$$b_1^{Y,m} = \frac{1}{a_1^{Y,m}} b_0^{Y,m} = \bar{p}_j^Y - b_1^{Y,m}\bar{v}_{m,start}^Y, \quad \text{[Equation 38]}$$

$$m = 0, 1, \ldots \Omega^Y - 1$$

Figure 14:
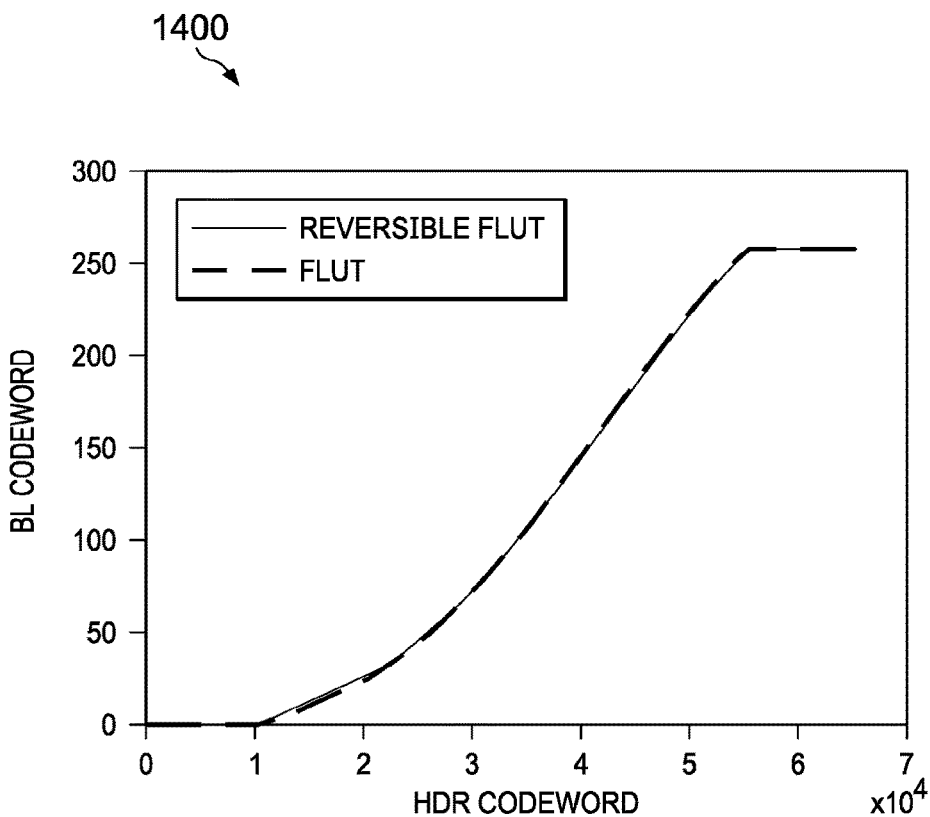
FIG. 14 depicts an example graph comparing a revertible forward look-up table compared to a compute-point forward look-up table.

FIG. 14 provides a graph (1400) illustrating the revertible FLUT (magenta line) compared with the FLUT directly constructed using the compute-point FLUT (green line). The difference between the revertible FLUT and the compute-point FLUT assists in avoiding visual artifacts due to polynomial approximation errors. As one particular example for computing the luma revertible FLUT, the following pseudo-code is presented using a C-like format:

```
// construct revertible FLUT
// for beginning
for (v = 0; v <= v_L^Y; v++ ) {
    T_F^Y(v)= 0;
}
for (m = 0; m < Ω^Y; m ++) {
    v̄_{m,start}^Y = T̂_Y^B (m)
    v_{m,start}^Y = round[v̄_{m,start}^Y * N_v];
    v_{m,end}^Y = round[T̂_Y^B(m + 1) * N_v];
    // compute slope and intercept
    if (a_1^{Y,m})
        b_1^{Y,m} = 1.0 / a_1^{Y,m};
    else
        b_1^{Y,m} = 0;
    b_0^{Y,m} = p̄_m^Y - v̄_{m,start}^Y * b_1^{Y,m};
    // compute revertible FLUT for this piece
    for (v = v_{m,start}^Y; v <= v_{m,end}^Y; v++ ) {
        v̄ = v / N_v;
        T_Y^F(v) = round[(N_s - 1).(v̄ * b_1^{Y,m} + b_1^{Y,m})];
    }
}
// compute end
for ( ; v < N_v; v ++ ) {
    T_Y^F(v) = N_s - 1;
}
```

Figure 15:
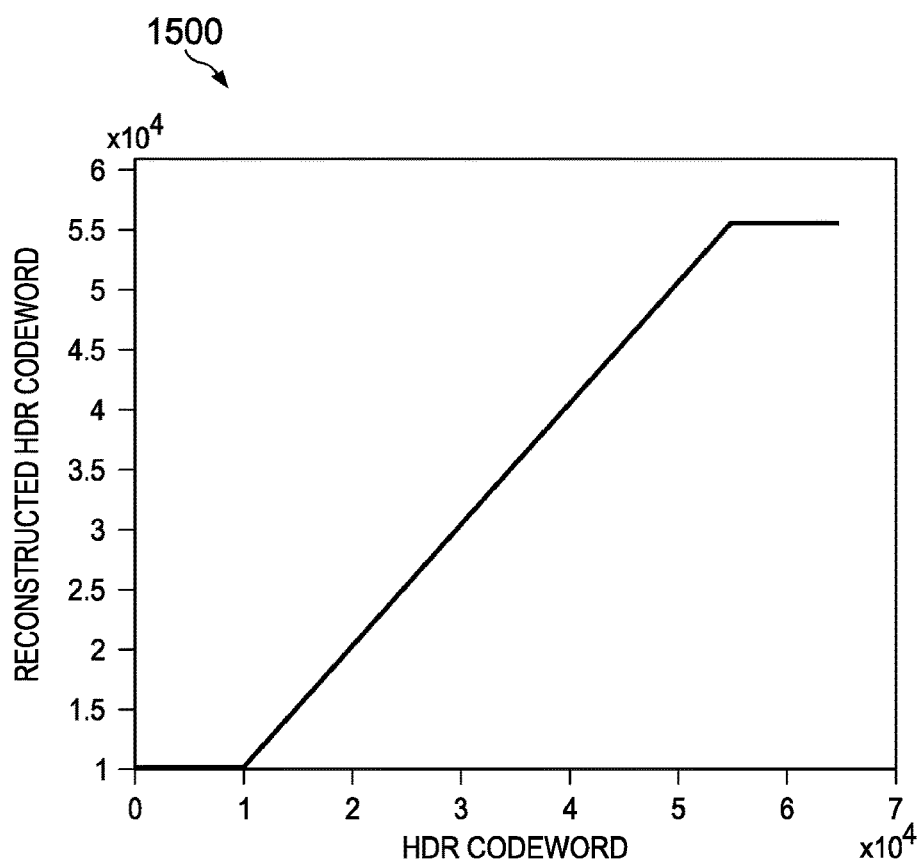
FIG. 15 depicts an example graph showing revertability of the revertible forward look-up table of FIG. 14.

FIG. 15 provides a graph (1500) illustrating the 1:1 revertability of the revertible FLUT and polynomial-approximation BLUT. The x-axis in graph (1500) shows the original HDR codeword. For a codeword v, the revertible FLUT is applied, followed by polyfit-BLUT, to get back the reconstructed HDR codeword. The y-axis shows the reconstruction:

$$\text{round}\left[N_v \cdot T_Y^B\left(\frac{T_p^F(v)}{N_s}\right)\right].$$

Here, $T_Y^B$ is constructed using the 8-piece polynomial at all normalized BL codewords.

Graph (1500) includes a 45-degree line that indicates the proposed reshaping operation is properly revertible. Visible steps in some part of the graph (1500) (lower codewords in this example) indicate a higher quantization due to less codewords being allocated in those parts. This shows the non-linearity of the proposed reshaping function that allows for an unequal distribution of codewords.

Returning to FIG. 7, at step (718), the encoder (200) generates an output image and corresponding metadata. The output image is the HDR image frame received in step (702) expressed as an 8-bit base layer (the HDR image frame following noise injection, forward reshaping, and compressing). The luma BLUT polynomial is provided as metadata alongside the base layer such that decoder (300) reconstructs the output image to an HDR image.

Accordingly, the use of an 8-piece polynomial function for luma reshaping avoids costly computations and reduces latency. Additionally, the use of Gaussian curves whose parameters are determined based on image features minimizes banding within the image frames.

Figure 16:
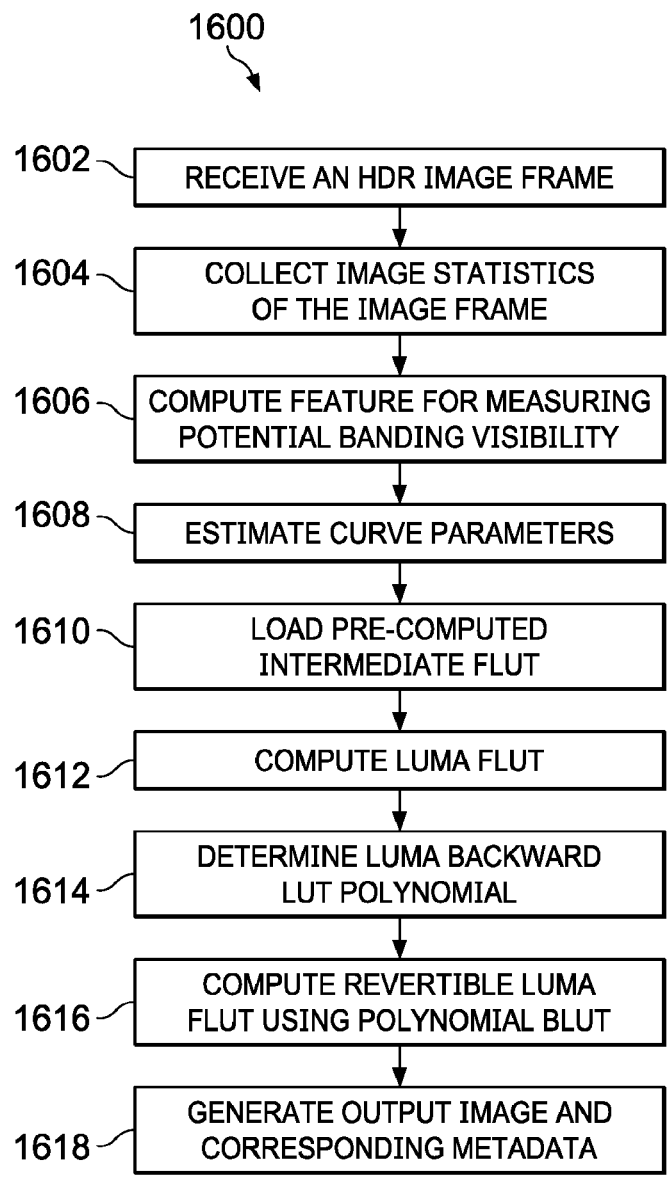
FIG. 16 depicts an example method performed by the encoder of FIG. 2.

In some implementations, the encoder (200) pre-builds a number of Gaussian dLUTs and their cumulate addition (or intermediate) intermediate FLUTs: $\tilde{T}_Y^{F,C}(\cdot)$. FIG. 16 illustrates a method (1600) for determining the luma reshaping algorithm. The method (1600) may be performed by the encoder (200). The method (1600) is similar to the method (700). However, instead of constructing a dLUT to compute a luma FLUT, as in steps (710) and (712) respectively, the method (1600) uses a pre-built intermediate FLUT to compute a luma FLUT, as shown in steps (1610) and (1612), respectively.

As previously described, there are two parameters: $\mu_G$ and $k_G$ to construct the Gaussian curve. A 2D table is pre-built, which can be addressed using an index-pair: $(\pi_\mu, \pi_k)$, where $\pi_\mu=0,1, \ldots, \Pi_\mu-1$ and $\pi_k=0,1, \ldots, \Pi_k-1$. A $\Delta\mu_G$ stepsize is used for $\mu_G$ and $\Delta k_G$ for $k_G$ parameters to construct a $(\Pi_\mu \times \Pi_k)$-sized look up table, in which each entry indexed by $(\pi_\mu, \pi_k)$ is an intermediate FLUT: $\tilde{T}_{Y, \{\pi_\mu, \pi_k\}}^{F,C}(\cdot)$.

Here, $$\Pi_\mu = \frac{1}{\Delta\mu_G} + 1.$$

For example, if $\Delta\mu_G=0.1$ is the step size, there are 11 entries between [0,1]. Similarly, $$\Pi_k = \frac{(k_{G,max} - k_{G,min})}{\Delta k_G} + 1.$$

For example, if $(k_{G,min}, k_{G,max})=(2,10)$ and $\Delta k_G=0.5$, there will be $\Pi_k=17$ entries. Thus, the 2D look-up table will have $(\Pi_\mu \times \Pi_k)=11 \times 17=187$ pre-computed FLUTs that are mapping entire HDR codeword range from [0,1] to BL.

As one particular example for pre-computing intermediate FLUTs, the following pseudocode is presented using a C-like format:

```
// Pre-compute intermediate FLUTs T_{Y,{π_μ,π_k}}^{F,C}(.) for
full range at N_C compute-points to build 2D look-up table
indexed by π_μ = 0, 1, ... , Π_μ – 1 and π_k = 0,1, ... , Π_k – 1.
for (π_k = 0; π_k < Π_k; π_k ++)
{
  // obtain current k_G
  k_G = k_{G,min} + π_k * Δk_G
  for (π_μ = 0; π_μ < Π_μ; π_μ ++)
  {
    // obtain current μ_G
    μ_G = π_μ * Δμ_G
    // 0th compute-point
    π_C = 1/N_C;

x_0 = 0.5 * π_C;
    T̃_{Y,{π_μ,π_k}}^{F,C}(0) = max(e^{-{kG(x0−μG)²}}, δ_{Y,MAX})
    // other compute points
    for (i = 1; i < N_C; i++ ) {
      x_i = (i + 0.5) * π_C;
      δ_temp = max(e^{-{kG(xi−μG)²}}, δ_{Y,MAX})
      T̃_{Y,{π_μ,π_k}}^{F,C}(i) = T̃_Y^{F,C}(i – 1) + δ_temp;
    }
  }
}
```

With the pre-built tables, for a given frame f, image features are computed and parameters $\mu_{G,f}$, $k_{G,f}$ are estimated by the encoder (200). Next, these are quantized to find the corresponding indices ($\pi_{\mu,f}$, $\pi_{k,f}$) using:

$$\pi_{u,f} = \text{clip3}\left[\text{round}\left[\mu_{G,f} * \left(\prod\nolimits_\mu - 1\right)\right], 0, \prod\nolimits_\mu - 1\right],$$

$$\pi_{k,f} = \text{clip3}\left[\text{round}\left[\frac{(k_{G,f} - k_{G,min}) * \left(\prod_k - 1\right)}{k_{G,max} - k_{G,min}}\right], 0, \prod\nolimits_k - 1\right]$$

$\tilde{T}_{Y, \{\pi_\mu, \pi_k\}}^{F,C}(\cdot)$ is loaded, saving on Gaussian curve computations that involve an exponential term.

Chroma Reshaping Functions

For chroma channels, luma-weighted reshaping is used. This facilitates assigning more importance to reshaped luma content than that of chroma, aiding typical video compression to spend more bits on the more-visually-significant luma part.

First, the range of BL codewords to be used for p chroma channel, p=Cb or Cr is determined based on the ratio of HDR chroma range to luma range. Specifically, the number of BL codewords used in channel p is denoted by $s_{range}^p$ and computed as:

$$s_{range}^p = \min\left(\text{round}\left[N_s\left(\frac{v_H^p - v_L^p}{v_H^Y - v_L^Y}\right)\right], N_s\right) \quad [\text{Equation 39}]$$

The chroma-neutral point is shifted to the center of BL axis such that the minimum and maximum reshaped BL codewords $s_{min}^p$, $s_{max}^p$ are:

$$s_{min}^p = \text{round}\left[\frac{N_s}{2} - \frac{s_{range}^p}{2}\right] \text{ and } s_{max}^p = \text{round}\left[\frac{N_s}{2} + \frac{s_{range}^p}{2}\right] \quad [\text{Equation 40}]$$

Thus, the chroma forward reshaping for channel p is:

$$T_p^F(v) = \begin{cases} s_{min}^p & \text{for } v < v_L^p \\ s_{min}^p + \text{round}\left[\left(\frac{s_{range}^p}{v_H^p - v_L^p}\right)(v - v_L^p)\right] & \text{for } v_L^p \leq v < v_H^p \\ s_{max}^p & \text{for } v \geq v_H^p \end{cases} \quad [\text{Equation 41}]$$

The corresponding backward reshaping function is:

$$T_p^B(s) = v_L^p + \text{round}\left[\left(\frac{v_H^p - v_L^p}{s_{range}^p}\right)(s - s_{min}^p)\right] \quad [\text{Equation 42}]$$

The p-channel chroma backward reshaping parameters are expressed as first order polynomials using a 1-piece $1^{st}$ order polynomial (straight line) coefficients $\alpha_0^{p,0}$ and $a_1^{p,0}$:

$$a_1^{p,0} = \left(\frac{v_H^p - v_L^p}{s_{range}^p}\right)\left(\frac{N_s}{N_v}\right) \text{ and } a_0^{p,0} = v_L^p - a_1^{p,0}\bar{s}_{min}^p \quad [\text{Equation 43}]$$

where $$\bar{s}_{min}^p = \frac{s_{min}^p}{N_s}.$$

As one particular example for computing revertible reshaping functions for p-chroma channel, the following pseudocode is presented using a C-like format:

```
// compute chroma FLUT and BLUT coeff
v_range^P = v_H^P - v_L^P;
v_range^Y = v_H^Y - v_L^Y;
// If v_H^P == v_L^P, assign mid-value
if (v_range^P == 0) {
  T_p^F(v) = N_s/2;
  a_0^{p,0} = 0.5;
  a_1^{p,0} = 0;
  ρ_0^p = 0;
  ρ_1^p = N_s – 1;
}
else {// construct chroma FLUT
  s̄_range^p = min(v_range^P/v_range^Y, 1 );
  s_min^p = –CLIP3(round[N_s/2 (1 – s̄_range^p)], 0, N_s – 1)
  s_max^p = CLIP3(round[N_s/2 (1 + s̄_range^p)], 0, N_s – 1)
  γ^p = (s_range^p / (v_H^p - v_L^p))
  for (v = 0; v < v_L^p; v++ ) {
    T_p^F(v) = s_min^p;
  }
  for ( ; v <= v_H^p; v++ ) {
    T_p^F(v) = s_min^p + round[γ^p(v - v_L^p)];
  }
  for ( ; v < N_v; v ++ ) {
    T_p^F(v) = s_max^p;
  }
  // chroma BLUT coefficients
  ρ_0^p = s_min^p;
  ρ_1^p = s_max^p;
  // slope
  a_1^{p,0} = N_s/(γ^p·N_v);
  // intercept
```

$$a_0^{P,0} = v_L^P/N_v - a_1^{P,0} \cdot \rho_0^P/N_s;$$
}

Noise Injection

As previously described, the encoder (200) includes a noise injection block (202) that injects film-grain noise to the HDR luma channel. After noise is injected, the HDR image is forward-reshaped to generate a BL signal using the determined reshaping functions. As one particular example for noise injection and forward reshaping, the following pseudocode is presented using a C-like format:

```
// inject noise to luma plane in the non-letterbox region
// recall active image-content between rows (r_min^v, r_max^v) and columns (c_min^v, c_max^v),
OFFSET = r_min^v * W + c_min^v;
for ( y = r_min^v; y <= r_max^v; y++ ){
  for ( x = c_min^v; x <= c_max^v; x++ ){
    ptr = (x + n) * W + (y + m)
    v̄_ptr^Y = v_ptr^Y + ℓ . Ξptr
  }
}
// luma reshaping
for (i = 0; i < WH; i++) {
  s_i^Y = T_Cb^F(v̄_i^Y);
}
// chroma reshaping
for (i = 0; i < WH/4; i++) {
  s_i^Cb = T_Cb^F(v_i^Cb);
  s_i^Cr = T_Cr^F(v_i^Cr);
}
```

Here, l is the fixed maximum noise strength and $\Xi$ is ith pixel value of normalized $[-1,1]$ noise image. The noise image is generated using a pseudo-random number as index to select an image from noise-image bank, pre-computed and stored.

Linear Encoding Architecture

In some implementations, reshaping methods described herein are implemented using linear encoding architecture. One example of linear encoding architecture is provided in WIPO Publication No. WO2019/169174, "Linear Encoder for image/video processing," by N. J. Gadgil and G-M Su, which is incorporated herein by reference in its entirety.

The above video delivery systems and methods may provide for encoding high dynamic range (HDR) video data using reshaping functions. Systems, methods, and devices in accordance with the present disclosure may take any one or more of the following configurations.

(1) A video delivery system for context-based encoding of video data, the delivery system comprising: a processor to perform encoding of video data, the processor configured to: receive the video data, the video data composed of a plurality of image frames, each image frame including a plurality of pixel blocks, determine, for each pixel block, a luma bin index, determine, for each luma bin, a banding risk value, determine Gaussian function parameters based on the banding risk value, generate a differential reshaping function using the Gaussian function parameters, compute a luma-based forward reshaping function based on the differential reshaping function, and generate an output image for each image frame by applying the luma-based forward reshaping function to the respective image frame.

(2) The video delivery system according to (1), wherein the Gaussian function includes a mean value and a width value, and wherein the mean value and the width value are each based on the banding risk value.

(3) The video delivery system according to any one of (1) to (2), wherein the processor is further configured to: determine a backwards reshaping function based on the luma-based forward reshaping function.

(4) The video delivery system according to (3), wherein the backwards reshaping function is approximated in the form of an 8-piece $1^{st}$ order polynomial curve.

(5) The video delivery system according to any one of (1) to (4), wherein the processor is further configured to: determine maximum and minimum pixel values from luma and chroma channels of each of the plurality of image frames, and identify a letterbox within each of the plurality of image frames.

(6) The video delivery system according to any one of (1) to (5), wherein the processor is further configured to: compute, for each pixel block, a mean for luma pixel values included in the pixel block, and compute, for each pixel block, a standard deviation for luma pixel values included in the pixel block.

(7) The video delivery system according to (6), wherein the banding risk value determined for each luma bin is determined based on the mean and the standard deviation for luma pixel values included in each pixel block.

(8) The video delivery system according to any one of (1) to (7), wherein the processor is further configured to: compute a block histogram by counting a number of pixels that have a first block-mean bin index, and compute a block standard deviation by averaging standard deviation over all pixel blocks that have the first block-mean bin index.

(9) A method for context-based encoding of video data, the method comprising: receiving the video data, the video data composed of a plurality of image frames, each image frame including a plurality of pixel blocks, determining, for each pixel block, a luma bin index, determining, for each luma bin, a banding risk value, determining Gaussian function parameters based on the banding risk value, generating a differential reshaping function using the Gaussian function parameters, computing a luma-based forward reshaping function based on the differential reshaping function, and generating an output image for each image frame by applying the luma-based forward reshaping function to the respective image frame.

(10) The method according to (9), wherein the Gaussian function includes a mean value and a width value, and wherein the mean value and the width value are each based on the banding risk value.

(11) The method according to any one of (9) to (10), further comprising: determining a backwards reshaping function based on the luma-based forward reshaping function.

(12) The method according to (11), wherein the backwards reshaping function is approximated in the form of an 8-piece $1^{st}$ order polynomial curve.

(13) The method according to any one of (9) to (12), further comprising: determining maximum and minimum pixel values from luma and chroma channels of each of the plurality of image frames, and identifying a letterbox within each of the plurality of image frames.

(14) The method according to any one of (9) to (13), wherein determining, for each pixel block, the luma bin index includes: computing, for each pixel block, a mean for luma pixel values included in the pixel block, and computing, for each pixel block, a standard deviation for luma pixel values included in the pixel block.

(15) The method according to (14), wherein the banding risk value determined for each luma bin is determined based on the mean and the standard deviation for luma pixel values included in each pixel block.

(16) The method according to any one of (9) to (15), wherein determining, for each pixel block, the banding risk includes: computing a block histogram by counting a number of pixels that have a first block-mean bin index, and computing a block standard deviation by averaging standard deviation over all pixel blocks that have the first block-mean bin index.

(17) The method according to any one of (9) to (16), further comprising: adding noise to each image frame.

(18) The method according to any one of (9) to (17), wherein the differential reshaping function defines a number of codewords allocated to a given luminance range.

(19) The method according to any one of (9) to (18), further comprising: setting a floor value of the differential reshaping function.

(20) A non-transitory computer-readable medium storing instructions that, when executed by an electronic processor, cause the electronic processor to perform operations comprising the method according to any one of (9) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

Various aspects of the present invention may be appreciated from the following enumerated example embodiments (EEEs):

EEE1. A video delivery system for context-based encoding of video data, the delivery system comprising:
 a processor to perform encoding of video data, the processor configured to:
  receive the video data, the video data composed of a plurality of image frames, each image frame including a plurality of pixel blocks;
  determine, for each pixel block, a luma bin index;
  determine, for each luma bin, a banding risk value;
  determine Gaussian function parameters based on the banding risk value;
  generate a differential reshaping function using the Gaussian function parameters;
  compute a luma-based forward reshaping function based on the differential reshaping function; and
  generate an output image for each image frame by applying the luma-based forward reshaping function to the respective image frame.

EEE2. The video delivery system of EEE1, wherein the Gaussian function includes a mean value and a width value, and wherein the mean value and the width value are each based on the banding risk value.

EEE3. The video delivery system of EEE1, wherein the processor is further configured to:
 determine a backwards reshaping function based on the luma-based forward reshaping function.

EEE4. The video delivery system of EEE3, wherein the backwards reshaping function is approximated in the form of an 8-piece 1st order polynomial curve.

EEE5. The video delivery system of EEE1, wherein the processor is further configured to:
 determine maximum and minimum pixel values from luma and chroma channels of each of the plurality of image frames; and
 identify a letterbox within each of the plurality of image frames.

EEE6. The video delivery system of EEE1, wherein the processor is further configured to:
 compute, for each pixel block, a mean for luma pixel values included in the pixel block; and
 compute, for each pixel block, a standard deviation for luma pixel values included in the pixel block.

EEE7. The video delivery system of EEE6, wherein the banding risk value determined for each luma bin is determined based on the mean and the standard deviation for luma pixel values included in each pixel block.

EEE8. The video delivery system of EEE1, wherein the processor is further configured to:
  compute a block histogram by counting a number of pixels that have a first block-mean bin index; and
  compute a block standard deviation by averaging standard deviation over all pixel blocks that have the first block-mean bin index.

EEE9. A method for context-based encoding of video data, the method comprising:
  receiving the video data, the video data composed of a plurality of image frames, each image frame including a plurality of pixel blocks;
  determining, for each pixel block, a luma bin index;
  determining, for each luma bin, a banding risk value;
  determining Gaussian function parameters based on the banding risk value;
  generating a differential reshaping function using the Gaussian function parameters;
  computing a luma-based forward reshaping function based on the differential reshaping function; and
  generating an output image for each image frame by applying the luma-based forward reshaping function to the respective image frame.

EEE10. The method of EEE9, further comprising:
  storing a normalized base-layer codeword as a single-channel forward reshaping function.

EEE11. The method of EEE9, further comprising:
  determining a backwards reshaping function based on the luma-based forward reshaping function.

EEE12. The method of EEE11, wherein the backwards reshaping function is approximated in the form of an 8-piece 1st order polynomial curve.

EEE13. The method of EEE9, further comprising:
  determining maximum and minimum pixel values from luma and chroma channels of each of the plurality of image frames; and
  identifying a letterbox within each of the plurality of image frames.

EEE14. The method of EEE9, wherein determining, for each pixel block, the luma bin index includes:
  computing, for each pixel block, a mean for luma pixel values included in the pixel block; and
  computing, for each pixel block, a standard deviation for luma pixel values included in the pixel block.

EEE15. The method of EEE14, wherein the banding risk value determined for each luma bin is determined based on the mean and the standard deviation for luma pixel values included in each pixel block.

EEE16. The method of EEE9, wherein determining, for each luma bin, the banding risk includes:
  computing a block histogram by counting a number of pixels that have a first block-mean bin index; and
  computing a block standard deviation by averaging standard deviation over all pixel blocks that have the first block-mean bin index.

EEE17. The method of EEE9, further comprising:
  adding noise to each image frame.

EEE18. The method of EEE9, wherein the differential reshaping function defines a number of codewords allocated to a given luminance range.

EEE19. The method of EEE9, further comprising:
  setting a floor value of the differential reshaping function.

EEE20. A non-transitory computer-readable medium storing instructions that, when executed by an electronic processor, cause the electronic processor to perform operations comprising the method of EEE9.

The invention claimed is:

1. A video delivery system for encoding of HDR video data, the delivery system comprising:
  a processor to perform encoding of HDR video data, the processor configured to:
    receive the HDR video data, the HDR video data composed of a plurality of image frames, each image frame including a plurality of pixel blocks;
    compute, for each pixel block k, a mean for luma pixel values included in the pixel block k;
    compute, for each pixel block k, a standard deviation for luma pixel values included in the pixel block k;
    determine, for each pixel block k, a block-mean bin index $b_k$, wherein the entire HDR luma codeword range is divided into $N_B$ non-overlapping luma bins, wherein each luma bin b represents a corresponding discrete luma codeword range, and wherein the block-mean bin index $b_k$ is the floor function of multiplying the mean for luma pixel values included in the pixel block k with $N_B$;
    compute, for each luma bin b, a block histogram by counting a number of pixels that have a block-mean bin index $b_k$ equal to b;
    compute, for each luma bin b, a block standard deviation by averaging standard deviation over all pixel blocks that have a block-mean bin index $b_k$ equal to b;
    determine, for each luma bin b, a banding risk value, wherein the banding risk value is determined using a multiplicative combination of the block histogram and the block standard deviation of the respective luma bin;
    determine a Gaussian function defined by Gaussian function parameters including a mean value and a width value of a corresponding Gaussian distribution, wherein the width value is the reciprocal of the doubled square of the standard deviation of the Gaussian distribution, wherein the mean value of the Gaussian function parameters is set to the maximum banding risk value across all luma bins;
    generate a differential reshaping function using the Gaussian function parameters, the differential reshaping function specifying the amount of increment to the next lower input value of the differential reshaping function;
    compute a luma-based forward reshaping function based on the differential reshaping function, wherein the luma-based forward reshaping function is a monotonically non-decreasing function that transfers a higher bit-depth codeword to a lower bit-depth by using the differential reshaping function; and
    generate an output image for each image frame by applying the luma-based forward reshaping function to the respective image frame.

2. The video delivery system according to claim 1, wherein the width value of the Gaussian function parameters is selected based on image statistics such that the most banding prone luminance range is covered by the Gaussian function.

3. The video delivery system according to claim 1, wherein the processor is further configured to:
  store a normalized base-layer codeword as a single-channel forward reshaping function.

4. The video delivery system according to claim 1, wherein the processor is further configured to:
  determine a backwards reshaping function based on the luma-based forward reshaping function.

5. The video delivery system according to claim 4, wherein the backwards reshaping function is approximated in the form of an 8-piece $1^{st}$ order polynomial curve.

6. The video delivery system according to claim 1, wherein the differential reshaping function defines a number of codewords allocated to a given luminance range.

7. A method for encoding of HDR video data, the method comprising:
  receiving the HDR video data, the HDR video data composed of a plurality of image frames, each image frame including a plurality of pixel blocks;
  computing, for each pixel block k, a mean for luma pixel values included in the pixel block k;
  computing, for each pixel block k, a standard deviation for luma pixel values included in the pixel block k;
  determining, for each pixel block k, a block-mean bin index index $b_k$, wherein the entire HDR luma codeword range is divided into $N_B$ non-overlapping luma bins, wherein each luma bin b represents a corresponding discrete luma codeword range, and wherein the block-mean bin index $b_k$ is the floor function of multiplying the mean for luma pixel values included in the pixel block k with $N_B$;
  computing, for each luma bin b, a block histogram by counting a number of pixels that have a block-mean bin index $b_k$ equal to b;
  computing, for each luma bin b, a block standard deviation by averaging standard deviation over all pixel blocks that have a block-mean bin index $b_k$ equal to b;
  determining, for each luma bin b, a banding risk value, wherein the banding risk value is determined using a multiplicative combination of the block histogram and the block standard deviation of the respective luma bin;
  determining a Gaussian function defined by Gaussian function parameters including a mean value and a width value of a corresponding Gaussian distribution, wherein the width value is the reciprocal of the doubled square of the standard deviation of the Gaussian distribution, wherein the mean value of the Gaussian function parameters is set to the maximum banding risk value across all luma bins;
  generating a differential reshaping function using the Gaussian function parameters, the differential reshaping function specifying the amount of increment to the next lower input value of the differential reshaping function;
  computing a luma-based forward reshaping function based on the differential reshaping function, wherein the luma-based forward reshaping function is a monotonically non-decreasing function that transfers a higher bit-depth codeword to a lower bit-depth by using the differential reshaping function; and
  generating an output image for each image frame by applying the luma-based forward reshaping function to the respective image frame.

8. The method according to claim 7, wherein the width value of the Gaussian function parameters is selected based on image statistics such that that the most banding prone luminance range is covered by the Gaussian function.

9. The method according to claim 7, further comprising:
  storing a normalized base-layer codeword as a single-channel forward reshaping function.

10. The method of according to claim 7, further comprising:
  determining a backwards reshaping function based on the luma-based forward reshaping function.

11. The method according to claim 10, wherein the backwards reshaping function is approximated in the form of an 8-piece $1^{st}$ order polynomial curve.

12. The method according to claim 7, wherein the differential reshaping function defines a number of codewords allocated to a given luminance range.

13. A non-transitory computer-readable medium storing instructions that, when executed by an electronic processor, cause the electronic processor to perform operations comprising the method according to claim 1.

* * * * *